(12) United States Patent
Katou et al.

(10) Patent No.: US 9,822,246 B2
(45) Date of Patent: *Nov. 21, 2017

(54) PROCESS FOR PRODUCING RUBBER COMPOSITION

(75) Inventors: Seiichi Katou, Tokyo (JP); Satoshi Horie, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 262 days.

This patent is subject to a terminal disclaimer.

(21) Appl. No.: 14/110,090

(22) PCT Filed: Apr. 6, 2012

(86) PCT No.: PCT/JP2012/059591
§ 371 (c)(1),
(2), (4) Date: Dec. 11, 2013

(87) PCT Pub. No.: WO2012/137951
PCT Pub. Date: Oct. 11, 2012

(65) Prior Publication Data
US 2014/0171580 A1    Jun. 19, 2014

(30) Foreign Application Priority Data
Apr. 6, 2011 (JP) .................... 2011-084934

(51) Int. Cl.
| *C08J 3/20* | (2006.01) |
| *C08L 9/06* | (2006.01) |
| *B60C 1/00* | (2006.01) |
| *C08K 3/00* | (2006.01) |
| *C08K 5/00* | (2006.01) |
| *C08K 5/548* | (2006.01) |
| *C08K 3/04* | (2006.01) |
| *C08K 3/36* | (2006.01) |

(52) U.S. Cl.
CPC .................. *C08L 9/06* (2013.01); *B60C 1/00* (2013.01); *C08K 3/0033* (2013.01); *C08K 3/04* (2013.01); *C08K 3/36* (2013.01); *C08K 5/0025* (2013.01); *C08K 5/548* (2013.01)

(58) Field of Classification Search
CPC .... C08J 3/22; C08L 13/02; C08L 7/00; C08L 9/06
USPC ........................................ 523/351
See application file for complete search history.

(56) References Cited

U.S. PATENT DOCUMENTS

| 5,939,493 | A | 8/1999 | Hojo | |
| 9,115,257 | B2 * | 8/2015 | Katou | .................. C08J 3/20 |
| 9,228,072 | B2 * | 1/2016 | Katou | .................. C08K 3/36 |
| 2003/0008954 | A1 * | 1/2003 | Tadaki et al. | .............. 524/261 |
| 2003/0105242 | A1 | 6/2003 | Penot | |
| 2003/0144394 | A1 | 7/2003 | Penot et al. | |
| 2008/0161590 | A1 | 7/2008 | Cruse et al. | |
| 2009/0221751 | A1 | 9/2009 | Hasse et al. | |
| 2010/0105805 | A1 | 4/2010 | Sasaka | |

FOREIGN PATENT DOCUMENTS

| EP | 2 266 819 A1 | 12/2010 |
| EP | 2 623 551 A1 | 8/2013 |
| EP | 2 623 553 A1 | 8/2013 |
| EP | 2 623 554 A1 | 8/2013 |
| JP | 10-251449 A | 9/1998 |
| JP | 2002-521515 A | 7/2002 |
| JP | 2002-521516 A | 7/2002 |
| JP | 2003041059 A | 2/2003 |
| JP | 2003-523472 A | 8/2003 |
| JP | 2003-530443 A | 10/2003 |
| JP | 2009-524715 A | 7/2009 |
| JP | 2010514764 A | 5/2010 |
| WO | 2008/123306 A1 | 10/2008 |
| WO | 2012/043853 A1 | 4/2012 |
| WO | 2012/043855 A1 | 4/2012 |
| WO | 2012/043858 A1 | 4/2012 |

OTHER PUBLICATIONS

Communication from the European Patent Office dated Nov. 12, 2014, in European Patent Application No. 12768449.6.

* cited by examiner

*Primary Examiner* — Hannah Pak
(74) *Attorney, Agent, or Firm* — Sughrue Mion, PLLC

(57) ABSTRACT

Process for producing a rubber composition comprising a rubber component (A) comprising at least one selected from natural rubbers and synthetic diene rubbers, a filler containing an inorganic filler (B), a silane coupling agent (C), and at least two kinds of chemical agents (D) and (E) selected from guanidines, sulfenamides, thiazoles, thiurams, dithiocarbamates, thioureas, and xanthates, wherein the rubber composition is kneaded in a plurality of stages wherein, in the first stage (X) of kneading, the rubber component (A), all or a portion of the inorganic filler (B), all or a portion of the silane coupling agent (C), and at least two kinds of the chemical agents (D) and (E) are added and kneaded.

22 Claims, No Drawings

PROCESS FOR PRODUCING RUBBER COMPOSITION

CROSS REFERENCE TO RELATED APPLICATIONS

This is a National Stage of International Application No. PCT/JP2012/059591 filed Apr. 6, 2012, claiming priority based on Japanese Patent Application No. 2011-084934 filed Apr. 6, 2011, the contents of all of which are incorporated herein by reference in their entirety.

TECHNICAL FIELD

The present invention relates to a method for producing a rubber composition containing an inorganic filler and having an improved low-heat-generation property.

BACKGROUND ART

Recently, in association with the movement of global regulation of carbon dioxide emission associated with the increase in attraction to environmental concerns, the demand for low fuel consumption by automobiles is increasing. To satisfy the requirement, it is desired to reduce rolling resistance relating to tire performance. Heretofore, as a means for reducing the rolling resistance of tires, a method of optimizing tire structures has been investigated; however, at present, a technique of using a low-heat-generating rubber composition for tires has become employed as the most common method.

For obtaining such a low-heat-generating rubber composition, there is known a method of sing an inorganic filler such as silica or the like.

However, in incorporating an inorganic filler such as silica or the like in a rubber composition to prepare an inorganic filler-containing rubber composition, the inorganic filler, especially silica aggregates in the rubber composition (owing to the hydroxyl group in the surface of silica), and therefore, for preventing the aggregation, a silane coupling agent is used.

Accordingly, for successfully solving the above-mentioned problem by incorporation of a silane coupling agent, various trials have been made for increasing the activity of the coupling function of the silane coupling agent.

For example, Patent Reference 1 proposes a rubber composition containing, as basic components, at least (i) one diene elastomer, (ii) a white filler as a reinforcing filler and (iii) an alkoxysilane polysulfide as a coupling agent (white filler/diene elastomer) along with (iv) an enamine and (v) a guanidine derivative.

Patent Reference 2 discloses a rubber composition containing, as basic components, at least (i) one diene elastomer, (ii) a white filler as a reinforcing filler and (iii) an alkoxysilane polysulfide as a coupling agent (white filler/diene elastomer) along with (iv) zinc thiophosphate and (v) a guanidine derivative.

Patent Reference 3 describes a rubber composition containing, as basic components, at least (i) a diene elastomer, (ii) an inorganic filler as a reinforcing filler and (iii) an alkoxysilane polysulfide (PSAS) as an (inorganic filler/diene elastomer) coupling agent, as combined with (iv) an aldimine (R—CH=N—R) and (v) a guanidine derivative.

Further, Patent Reference 4 proposes a rubber composition basically containing at least (i) a diene elastomer, (ii) an inorganic filer as a reinforcing filer and (iii) an alkoxysilane polysulfide as a coupling agent, as combined with (iv) 1,2-dihydropyridine and (v) a guanidine derivative.

However, in these inventions, nothing is taken into consideration relating to kneading conditions.

Furthermore, although Patent Reference 5 may be cited as an example of improving the coupling function activity of the silane coupling agent with kneading conditions in consideration, further enhancement of the effect of improving the coupling function activity of the silane coupling agent is desired.

CITATION LIST

Patent References

[Patent Reference 1] JP-T 2002-521515
[Patent Reference 2] JP-T 2002-521516
[Patent Reference 3] JP-T 2003-530443
[Patent Reference 4] JP-T 2003-523472
[Patent Reference 5] WO2008/123306

SUMMARY OF THE INVENTION

Problems that the Invention is to Solve

Under such circumstances, the object of the present invention is to provide a process for producing a rubber composition, which enables a suitably low heat-generating rubber composition to be obtained by further improving the coupling function activity of the silane coupling agent.

Means for Solving the Problems

In order to accomplish the above object, the present inventors examined various kneading methods in a process for producing a rubber composition, wherein, in the first or a subsequent stage of the kneading process, a rubber component, all or a portion of an inorganic filler, all or a portion of the silane coupling agent, and at least two kinds of chemical agents (chemical agents used ordinarily as vulcanization accelerators) are kneaded. As a result, it was found that improvement of the coupling function activity can be obtained by adjusting the stage of kneading where at least two kinds of the accelerators are added. This finding led to completion of the present invention.

That is, the present invention provides:

[1] a process for producing a rubber composition comprising a rubber component (A) comprising at least one selected from natural rubbers and synthetic diene rubbers, a filler containing an inorganic filler (B), a silane coupling agent (C), and at least two kinds of chemical agents (D) and (E) selected from guanidines, sulfenamides, thiazoles, thiurams, dithiocarbamates, thioureas, and xanthates, wherein the rubber composition is kneaded in a plurality of stages wherein, in the first stage (X) of kneading, the rubber component (A), all or a portion of the inorganic filler (B), all or a portion of the silane coupling agent (C), and two of the chemical agents (D) and (E) are added and kneaded;

[2] the process for producing a rubber composition according to the above [1], wherein, in the first stage (X) of kneading, the rubber component (A), all or a portion of the inorganic filler (B), and all or a portion of the silane coupling agent (C) are kneaded and thereafter, during the first stage (X), at least two kinds of the chemical agents (D) and (E) are added and kneaded further;

[3] a process for producing a rubber composition comprising a rubber component (A) comprising at least one selected from natural rubbers and synthetic diene rubbers, a filler containing an inorganic filler (B), a silane coupling agent (C), and at least two kinds of chemical agents (D) and (E) selected from guanidines, sulfenamides, thiazoles, thiurams, dithiocarbamates, thioureas, and xanthates, wherein the rubber composition is kneaded in a kneading step comprising three or more stages wherein, in the first stage (X) of kneading, the rubber component (A), all or a portion of the inorganic filler (B), and all or a portion of the silane coupling agent (C) are kneaded; in a stage (Y) after the first stage but before the last stage of kneading, at least two kinds of the chemical agents (D) and (E) are added and kneaded; and, in the last stage (Z) of kneading, a vulcanizing agent is added and kneaded;

[4] a rubber composition produced by a process according to any of the above [1] to [3]; and

[5] a tire comprising the rubber composition according to the above [4].

Advantage of the Invention

According to the present invention, there can be provided processes for producing a rubber composition, which enable a rubber composition having an excellent low heat-generating property to be obtained by further improving the coupling function activity of the silane coupling agent.

MODE FOR CARRYING OUT THE INVENTION

Hereinafter, the first and the second inventions of the present invention will be explained in detail. When an explanation common to these first and second inventions is made, the inventions will be referred to as "the present invention," while when each of the first and second inventions is explained separately, the invention will be referred to as "the first invention" or as "the second invention."

In the present invention, the reason why the rubber component, all or a portion of the inorganic filler (B), all or a portion of the silane coupling agent (C) are kneaded in the first stage (X) of kneading is to make the reaction of the inorganic filler (B) and the silane coupling agent (C) proceed sufficiently.

The first stage of kneading (X) in the present invention is the first stage of kneading the rubber component (A), the inorganic filler (B) and the silane coupling agent (C), but does not include a case of kneading the rubber component (A) and the other filler than the inorganic filler (B) in the initial stage and a case of pre-kneading the rubber component (A) alone.

The first invention is a process for producing a rubber composition comprising a rubber component (A) comprising at least one selected from natural rubbers and synthetic diene rubbers, a filler containing an inorganic filler (B), a silane coupling agent (C), and at least two kinds of chemical agents (D) and (E) selected from guanidines, sulfenamides, thiazoles, thiurams, dithiocarbamates, thioureas, and xanthates, wherein the rubber composition is kneaded in a plurality of stages wherein, in the first stage (X) of kneading, the rubber component (A), all or a portion of the inorganic filler (B), all or a portion of the silane coupling agent (C), and at least two kinds of the chemical agents (D) and (E) are added and kneaded.

In the first invention, the reason why at least two kinds of chemical agents (D) and (E) are added and kneaded in the first stage (X) of kneading is to improve more suitably the coupling function activity of the silane coupling agent (C).

The chemical agents (D) and (E) are at least two selected from guanidines, sulfenamides, thiazoles, thiurams, dithiocarbamates, thioureas, and xanthates. This is so because these can improve reactivity of the silane coupling agents (C) significantly.

In the first invention, it is preferable that, in the first stage (X) of kneading, the rubber component (A), all or a portion of the inorganic filler (B), and all or a portion of the silane coupling agent (C), are kneaded and, thereafter, during the first stage (X), at least two kinds of the chemical agents (D) and (E) are added and kneaded further, which is a preferred embodiment.

The reason why at least two kinds of the chemical agents (D) and (E) are added during the first stage (X) of kneading is because the reaction of the silane coupling agent (C) and the rubber component (A) can be made to proceed after the inorganic filler (B) and the silane coupling agent (C) proceeded sufficiently and, thus, the coupling function activity of the silane coupling agent (C) can be further improved.

In the above embodiment of the first invention, the time after addition of the rubber component (A), all or a portion of the inorganic filler (B), and all or a portion of the silane coupling agent (C) until addition of the chemical agent (D) during the first stage is preferably 10 to 180 seconds. The lower limit of this time is more preferably 30 seconds or more; and the upper limit is more preferably 150 seconds or less, even more preferably 120 seconds or less. When this time is 10 seconds or more, the reaction of (B) and (C) can proceed sufficiently. Even if this time exceeded 180 seconds, the reaction of (B) and (C) had already proceeded sufficiently and no further effect can be acquired; and, when this time is 180 seconds or less, the unvulcanized viscosity does not become too high. Thus, the upper limit is preferably set to 180 seconds.

Further, in the above embodiment of the first invention, in order to more suitably improve the coupling function activity of the silane coupling agent (C), it is preferable, in the first stage of kneading, to add the at least two kinds of chemical agents (D) and (E) when temperature of the rubber composition reached 125 to 180° C.

Hereinafter, addition of the chemical agents during the first stage (X) may sometimes be referred to as "delayed addition of the chemical agents during the first stage (X)."

The second invention is a process for producing a rubber composition comprising a rubber component (A) comprising at least one selected from natural rubbers and synthetic diene rubbers, a filler containing an inorganic filler (B), a silane coupling agent (C), and at least two kinds of chemical agents (D) and (E) selected from guanidines, sulfenamides, thiazoles, thiurams, dithiocarbamates, thioureas, and xanthates, wherein the rubber composition is kneaded in a kneading step comprising three or more stages, wherein, in the first stage (X) of kneading, the rubber component (A), all or a portion of the inorganic filler (B), and all or a portion of the silane coupling agent (C) are kneaded; in a stage (Y) after the first stage and before the last stage of kneading, at least two kinds of the chemical agents (D) and (E) are added and kneaded; and, in the last stage (Z) of kneading, a vulcanizing agent is added and kneaded.

The kneading process of the rubber composition in the second invention includes at least the first stage (X) of kneading, a stage (Y) after the first stage but before the last stage of kneading, and the last stage (Z) of kneading. If necessary, other intermediate stages of kneading may be included.

The kneading step in the production process of the present invention suffices if it comprises three or more stages. The number of stages of kneading is not particularly limited but when productivity is considered, it comprises preferably eight or less stages, more preferably six or less stages, and even more preferably four or less stages.

In the second invention, the reason why kneading is carried out by a kneading step comprising three or more stages is in order to suppress decrease in molecular weight of the rubber component (A) due to kneading at high temperature for a long time. That is, if the time of one kneading stage is made longer in order to decrease the number of stages of kneading, the rubber component (A) becomes exposed to high temperature for a long time and results in a possible decrease in the molecular weight thereof. It is important to avoid this.

Furthermore, in the second invention, the reason why at least two kinds of chemical agents (D) and (E) are added and kneaded in a stage (Y) after the first stage but before the last stage of kneading is because, after a reaction of the inorganic filler (B) and the silane coupling agent (C) proceeded sufficiently, the coupling function activity of the silane coupling agent (C) is improved by the chemical agents (D) and (E) and a reaction of the silane coupling agent (C) and a rubber component (A) can be made to proceed more suitably. In order to enable the reaction of the silane coupling agent (C) and the rubber component (A) to proceed even more suitably, the maximum temperature of the rubber composition in the stage (Y) of kneading is preferably 120 to 190° C., more preferably 120 to 175° C., and even more preferably 130 to 175° C.

In the present invention, in order to enable the reaction of the silane coupling agent (C) and the rubber component (A) to proceed even more suitably by more suitably improving the coupling function activity of the above silane coupling agent (C), the maximum temperature of the rubber composition in the first stage (X) is preferably 120 to 190° C., more preferably 120 to 175° C., and especially preferably 130 to 175° C.

[Silane Coupling Agent (C)]

The silane coupling agent (C) used in the process for producing a rubber composition of the present invention is preferably one or more compounds selected from the group consisting of the compounds represented by the following general formulae (I) to (IV).

Using the silane coupling agent (C) of the type, the rubber composition in the present invention is excellent in workability thereof and can give pneumatic tires having good abrasion resistance.

General formulae (I) and (IV) are sequentially described below.

[Chemical Formula 1]

$(R^1O)_{3-p}(R^2)_p Si—R^3—S_a—R^3—Si(OR^1)_{3-r}(R^2)_r$ (I)

In the formula, $R^1$'s may be the same or different and are each a linear, cyclic, or branched alkyl group, having 1 to 8 carbon atoms, or a linear or branched alkoxyalkyl group having 2 to 8 carbon atoms; $R^2$'s may be the same or different and are each a linear, cyclic, or branched alkyl group, having 1 to 8 carbon atoms; $R^3$'s may be the same or different and are each a linear or branched alkylene group, having 1 to 8 carbon atoms; a is 2 to 6 as an average value; and p and q may be the same or different and are each 0 to 3 as an average value, provided that p and r are not 3 at the same time.

Specific examples of the silane coupling agent (C) represented by the above-mentioned general formula (I) include bis(3-triethoxysilylpropyl)tetrasulfide, bis(3-trimethoxysilylpropyl)tetrasulfide, bis(3-methyldimethoxysilylpropyl)tetrasulfide, bis(2-triethoxysilylethyl)tetrasulfide, bis(3-triethoxysilylpropyl)disulfide, bis(3-trimethoxysilylpropyl)disulfide, bis(3-methyldimethoxysilylpropyl)disulfide, bis(2-triethoxysilylethyl)disulfide, bis(3-triethoxysilylpropyl)trisulfide, bis(3-trimethoxysilylpropyl)trisulfide, bis(3-methyldimethoxysilylpropyl)trisulfide, bis(2-triethoxysilylethyl)trisulfide, bis(3-monoethoxydimethylsilylpropyl)tetrasulfide, bis(3-monoethoxydimethylsilylpropyl)trisulfide, bis(3-monoethoxydimethylsilylpropyl)disulfide, bis(3-monomethoxydimethylsilylpropyl)tetrasulfide, bis(3-monomethoxydimethylsilylpropyl)trisulfide, bis(3-monomethoxydimethylsilylpropyl)disulfide, bis(2-monoethoxydimethylsilylethyl)tetrasulfide, bis(2-monoethoxydimethylsilylethyl)trisulfide, bis(2-monoethoxydimethylsilylethyl)disulfide.

[Chemical Formula 2]

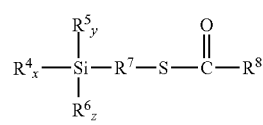

(II)

In the formula, $R^4$ is a monovalent group selected from —Cl, —Br, $R^9O$—, $R^9(C=O)O$—, $R^9R^{10}C=NO$—, $R^9R^{10}CNO$—, $R^9R^{10}N$—, and —$(OSiR^9R^{10})_h$ $(OSiR^9R^{10}R^{11})$ ($R^9$, $R^{10}$, and $R^{11}$ may be the same or different and are each a hydrogen atom or a monovalent hydrocarbon group having 1 to 18 carbon atoms); $R^5$ represents $R^4$, a hydrogen atom, or a monovalent hydrocarbon group having 1 to 18 carbon atoms; $R^6$ represents $R^4$, $R^5$, a hydrogen atom, or a —$[O(R^{12}O)_j]_{0.5}$— group ($R^{12}$ is an alkylene group having 1 to 18 carbon atoms and j is an integer from 1 to 4); $R^7$ represents a divalent hydrocarbon group having 1 to 18 carbon atoms; $R^8$ represents a monovalent hydrocarbon group having 1 to 18 carbon atoms; and x, y, and z are numbers which satisfy the relationships: x+y+2z=3, 0≤x≤3, 0≤y≤2, and 0≤z≤1.

In the above general formula (II), $R^8$, $R^9$, $R^{10}$, and $R^{11}$ may be the same or different and are each preferably a group selected from the group consisting of a linear, cyclic, or a branched alkyl group, an alkenyl group, an aryl group, and an aralkyl group, each having 1 to 18 carbon atoms. In addition, when $R^5$ is a monovalent hydrocarbon group having 1 to 18 carbon atoms, it is preferably a group selected from a linear, cyclic, or branched alkyl group, an alkenyl group, an aryl group, and an aralkyl group; $R^{12}$ is preferably a linear, cyclic, or branched alkylene group, especially a branched one; $R^7$ includes, for example, an aklylene group having 1 to 18 carbon atoms, an alkenylene group having 2 to 18 carbon atoms, a cycloalkylene group having 5 to 18 carbon atoms, a cycloalkylalkylene group having 6 to 18 carbon atoms, an arylene group having 6 to 18 carbon atoms, and an aralkylene group having 7 to 18 carbon atoms. The alkylene group and the alkenylene group may be either linear or branched; and the cycloalkylene group, the cycloalkylalkylene group, the arylene group, and the aralkylene group may have a substituent such as a lower alkyl group and the like on the ring. As this $R^7$, preferable is an alkylene group having 1 to 6 carbon atoms and there may especially preferably be mentioned a linear alkylene group, for example, a methylene group, an ethylene group, a trimethylene group, a tetramethylene group, a pentamethylene group, and a hexamethylene group.

In the above general formula (II), specific examples of the monovalent hydrocarbon groups having 1 to 18 carbon atoms of $R^5$, $R^8$, $R^9$, $R^{10}$, and $R^{11}$ include a methyl group, an ethyl group, a n-propyl group, an isopropyl group, a n-butyl group, an isobutyl group, a sec-butyl group, a tert-butyl group, a pentyl group, a hexyl group, an octyl group, a decyl group, a dodecyl group, a cyclopentyl group, a cyclohexyl group, a vinyl group, a propenyl group, an allyl group, a hexenyl group, an octenyl group, a cyclopentenyl group, a cyclohexenyl group, a phenyl group, a tolyl group, a xylyl group, a naphthyl group, a benzyl group, a phenethyl group, a naphthylmethyl group, and the like.

In the general formula (II), examples of $R^{12}$ include a methylene group, an ethylene group, a trimethylene group, a tetramethylene group, a pentamethylene group, a hexamethylene group, an octamethylene group, a decamethylene group, a dodecamethylene group, and the like.

Specific examples of the silane coupling agent represented by the general formula (II) include 3-hexanoylthiopropyltriethoxysilane, 3-octanoylthiopropyltriethoxysilane, 3-decanoylthiopropyltriethoxysilane, 3-lauroylthiopropyltriethoxysilane, 2-hexanoylthioethyltriethoxysilane, 2-octanoylthioethyltriethoxysilane, 2-decanoylthioethyltriethoxysilane, 2-lauroylthioethyltriethoxysilane, 3-hexanoylthiopropyltrimethoxysilane, 3-octanoylthiopropyltrimethoxysilane, 3-decanoylthiopropyltrimethoxysilane, 3-lauroylthiopropyltrimethoxysilane, 2-hexanoylthioethyltrimethoxysilane, 2-octanoylthioethyltrimethoxysilane, 2-decanoylthioethyltrimethoxysilane, 2-lauroylthioethyltrimethoxysilane, and the like. Among these, 3-octanoylthiopropyltriethoxysilane [trade name "NXT Silane" (registered trademark) produced by Momentive Performance Materials Inc.] is especially preferable

[Chemical Formula 3]

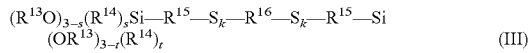

$$(R^{13}O)_{3-s}(R^{14})_s Si—R^{15}—S_k—R^{16}—S_k—R^{15}—Si(OR^{13})_{3-t}(R^{14})_t \quad (III)$$

In the formula, $R^{13}$'s may be the same or different and are each a linear, cyclic, or branched alkyl group, having 1 to 8 carbon atoms, or a linear or branched alkoxyalkyl group having 2 to 8 carbon atoms; $R^{14}$'s may be the same or different and are each a linear, cyclic, or branched alkyl group, having 1 to 8 carbon atoms; $R^{15}$'s may be the same or different and are each a linear or branched alkylene group, having 1 to 8 carbon atoms; $R^{16}$ is a divalent group of any of general formulae, (—S—$R^{17}$—S—), (—$R^{18}$—$S_{m1}$—$R^{19}$—), and (—$R_{20}$—$S_{m2}$—$R^{21}$—$S_{m3}$—$R^{22}$—) ($R^{17}$ to $R^{22}$ may be the same or different and are each a divalent hydrocarbon group, a divalent aromatic group or a divalent organic group containing a heteroatom other than sulfur and oxygen, each having 1 to 20 carbon atoms; and m1, m2, and m3 may be the same or different and are each 1 or more but less than 4 as an average value); k's may be the same or different and are each 1 to 6 as an average value; s and t may be the same or different and are each 0 to 3 as an average value, provided that s and t are not 3 at the same time.

Preferred examples of the silane coupling agent (C) represented by the above-mentioned general formula (III) are compounds represented by an average compositional formula $(CH_3CH_2O)_3Si—(CH_2)_3—S_2—(CH_2)_6—S_2—(CH_2)_3—Si(OCH_2CH_3)_3$, an average compositional formula $(CH_3CH_2O)_3Si—(CH_2)_3—S_2—(CH_2)_{10}—S_2—(CH_2)_3—Si(OCH_2CH_3)_3$, an average compositional formula $(CH_3CH_2O)_3Si—(CH_2)_3—S_3—(CH_2)_6—S_3—(CH_2)_3—Si(OCH_2CH_3)_3$, an average compositional formula $(CH_3CH_2O)_3Si—(CH_2)_3—S_4—(CH_2)_6—S_4—(CH_2)_3—Si(OCH_2CH_3)_3$, an average compositional formula $(CH_3CH_2O)_3Si—(CH_2)_3—S—(CH_2)_6—S_2—(CH_2)_6—S—(CH_2)_3—Si(OCH_2CH_3)_3$, an average compositional formula $(CH_3CH_2O)_3Si—(CH_2)_3—S—(CH_2)_6—S_{2.5}—(CH_2)_6—S—(CH_2)_3—Si(OCH_2CH_3)_3$, an average compositional formula $(CH_3CH_2O)_3Si—(CH_2)_3—S—(CH_2)_6—S_3—(CH_2)_6—S—(CH_2)_3—Si(OCH_2CH_3)_3$, an average compositional formula $(CH_3CH_2O)_3Si—(CH_2)_3—S—(CH_2)_6—S_4—(CH_2)_6—S—(CH_2)_3—Si(OCH_2CH_3)_3$, an average compositional formula $(CH_3CH_2O)_3Si—(CH_2)_3—S—(CH_2)_{10}—S_2—(CH_2)_{10}—S—(CH_2)_3—Si(OCH_2CH_3)_3$, an average compositional formula $(CH_3CH_2O)_3Si—(CH_2)_3—S_4—(CH_2)_6—S_4—(CH_2)_6—S_4—(CH_2)_3—Si(OCH_2CH_3)_3$, an average compositional formula $(CH_3CH_2O)_3Si—(CH_2)_3—S_2—(CH_2)_6—S_2—(CH_2)_6—S_2—(CH_2)_3—Si(OCH_2CH_3)_3$, an average compositional formula $(CH_3CH_2O)_3Si—(CH_2)_3—S—(CH_2)_6—S_2—(CH_2)_6—S_2—(CH_2)_6—S—(CH_2)_3—Si(OCH_2CH_3)_3$, etc.

[Chemical Formula 4]

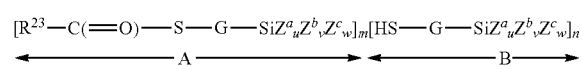

$$[R^{23}—C(=O)—S—G—SiZ^a_u Z^b_v Z^c_w]_m[HS—G—SiZ^a_u Z^b_v Z^c_w]_n \quad (IV)$$

←——A——→ ←——B——→

In the formula, $R^{23}$ is a linear, branched, or cyclic alkyl group, having 1 to 20 carbon atoms; G's may be the same or different and are each an alkanediyl group or an alkenediyl group, having 1 to 9 carbon atoms; $Z^a$'s may be the same or different and are each a group which can bond to two silicon atoms and is selected from [—O—]$_{0.5}$, [—O-G-]$_{0.5}$, or [—O-G-O—]$_{0.5}$; $Z^b$'s may be the same or different and are each a group which can bond to two silicon atoms and is a functional group represented by [—O-G-O—]$_{0.5}$; $Z^c$'s may be the same or different and are each a functional group represented by —Cl, —Br, —$OR^a$, $R^aC(=O)O$—, $R^aR^bC=NO$—, $R^aR^bN$—, $R^a$—, HO-G-O— (G is the same as the above description); $R^a$ and $R^b$ may be the same or different and are each a linear, branched, or cyclic alkyl group, having 1 to 20 carbon atoms; and m, n, u, v, and w may be the same or different and 1≤m≤20, 0≤n≤20, 0≤u≤3, 0≤v≤2, 0≤w≤1, and (u/2)+v+2w=2 or 3; when the A portion exists in plurality, $Z^a_u$'s, $Z^b_v$'s, and $Z^c_w$'s in the plural A portions may each be the same or different; and, when the B portion exists in plurality, $Z^a_u$'s, $Z^b_v$'s, and $Z^c_w$'s in the plural B portions may each be the same or different.

Specific examples of the silane coupling agent represented by the general formula (IV) include those represented by chemical formula (V), chemical formula (VI), and chemical formula (VII).

[Chemical Formula 5]

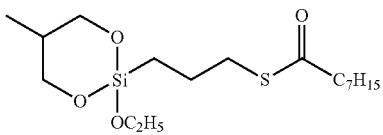

(V)

[Chemical Formula 6]

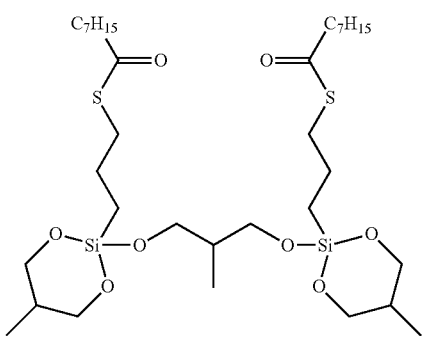

(VI)

[Chemical Formula 7]

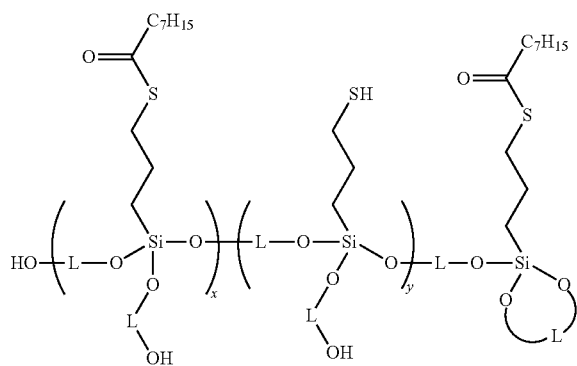

(VII)

In the formula, L's are each independently an alkanediyl group or an alkenediyl group having 1 to 9 carbon atoms; x=m; and y=n.

As a silane coupling agent represented by the chemical formula (V), there can be obtained commercially "NXT Low-V Silane" (trademark) produced by Momentive Performance Materials, Inc.

Furthermore, as a silane coupling agent represented by the chemical formula (VI), there can similarly be obtained commercially "NXT Ultra Low-V Silane" (trademark) produced by Momentive Performance Materials, Inc.

Further, as a silane coupling agent represented by the chemical formula (VII), there can be mentioned "NXT-Z" (trademark) produced by Momentive Performance Materials, Inc.

Because the above silane coupling agents represented by the general formula (II), the chemical formula (V), and the chemical formula (VI) possess protected mercapto groups, occurrence of initial vulcanization (scorch) during fabrication in processes before vulcanization can be prevented, resulting in good workability.

Furthermore, because, in the silane coupling agents represented by the chemical formulae (V), (VI), and (VII), the alkoxy silane groups have many carbon atoms, there is little generation of volatile organic compounds, VOC (especially alcohols), which is preferable in terms of work environments. Also, the coupling agent represented by the chemical formula (VII) is more preferable because it enables a low heat-generating property to be obtained as tire performance.

The silane coupling agent (C) involved in the present invention is especially preferably a compound represented by the general formula (I) among the compounds represented by the above general formulae (I) to (IV). This is so because the chemical agent (D) easily activates the polysulfide bond portion which reacts with the rubber component (A).

In the present invention, the silane coupling agent (C) may be used singly or in a combination of two or more.

The amount of the silane coupling agent (C) blended in the rubber composition of the present invention is preferably 1 to 20 mass % relative to the inorganic filler. This is so because, when the amount is less than 1 mass %, the effect of improving the low heat-generating property of the rubber composition becomes difficult to be displayed and, when the amount exceeds 20 mass %, the cost of the rubber composition becomes excessive and economic efficiency deteriorates. Furthermore, the amount is more preferably 3 to 20 mass % relative to the inorganic filler and especially preferably 4 to 10 mass % relative to the inorganic filler.

[Chemical Agents, (D) and (E)]

The guanidines, sulfenamides, thiazoles, thiurams, dithiocarbamates, thioureas, and xanthates which are cited as the chemical agents (D) and (E) used in the process for producing a rubber composition of the present invention will be described in detail.

Additionally, in the present invention, the chemical agents (D) and (E) are used also as vulcanization accelerators in sulfur vulcanization and may be blended in adequate amounts in the last stage of kneading, if desired.

In the present invention, the vulcanization accelerator added in the first stage (X) of kneading and/or in a stage (Y) before the last stage of kneading is referred to as the chemical agent in order to distinguish them from the vulcanization accelerator which is added in the last stage of kneading together with a vulcanizing agent such as sulfur and the like.

The guanidines used in the process for producing a rubber composition of the present invention include 1,3-diphenylguanidine, 1,3-di-o-tolylguanidine, 1-o-tolylbiguanide, di-o-tolylguanidine salt of dicatechol borate, 1,3-di-o-cumenylguanidine, 1,3-di-o-biphenylguanidine, 1,3-di-o-cumenyl-2-propionylguanidine, and the like. Among these, 1,3-diphenylguanidine, 1,3-di-o-tolylguanidine, and 1-o-tolylbiguanide are preferable because these are highly reactive.

The sulfenamides used in the process for producing a rubber composition of the present invention include N-cyclohexyl-2-benzothiazolylsulfenamide, N,N-dicyclohexyl-2-benzothiazolylsulfenamide, N-tert-butyl-2-benzothiazolylsulfenamide, N-oxydiethylene-2-benzothiazolylsulfenamide, N-methyl-2-benzothiazolylsulfenamide, N-ethyl-2-benzothiazolylsulfenamide, N-propyl-2-benzothiazolylsulfenamide, N-butyl-2-benzothiazolylsulfenamide, N-pentyl-2-benzothiazolylsulfenamide, N-hexyl-2-benzothiazolylsulfenamide, N-pentyl-2-benzothiazolylsulfenamide, N-octyl-2-benzothiazolylsulfenamide, N-2-ethylhexyl-2-benzothiazolylsulfenamide, N-decyl-2-benzothiazolylsulfenamide, N-dodecyl-2-benzothiazolylsulfenamide, N-stearyl-2-benzothiazolylsulfenamide, N,N-dimethyl-2- benzothiazolylsulfenamide, N,N-diethyl-2-benzothiazolylsulfenamide, N,N-dipropyl-2-benzothiazolylsulfenamide, N,N-dibutyl-2-benzothiazolylsulfenamide, N,N-dipentyl-2-benzothiazolylsulfenamide, N,N-dihexyl-2-benzothiazolylsulfenamide, N,N-dipentyl-2-benzothiazolylsulfenamide, N,N-dioctyl-2-benzothiazolylsulfenamide, N,N-di-2-ethylhexylbenzothiazolylsulfenamide, N-decyl-2-benzothiazolylsulfenamide, N,N-didodecyl-2-benzothiazolylsulfenamide, N,N-distearyl-2-benzothiazolylsulfenamide, and the like. Among these, N-cyclohexyl-2-benzothiazolylsulfenamide and N-tert-butyl-2-benzothiazolylsulfenamide are preferable because they are highly reactive.

The thiazoles used in the process for producing a rubber composition of the present invention include 2-mercaptobenzothiazole, di-2-benzothiazolyl disulfide, 2-mercaptobenzothiazole zinc salt, 2-mercaptobenzothiazole cyclohexylamine salt, 2-(N,N-diethylthiocarbamoylthio)benzothiazole, 2-(4'-morpholinodithio)benzothiazole, 4-methyl-2-mercaptobenzothiazole, di-(4-methyl-2-benzothiazolyl)disulfide, 5-chloro-2-mercaptobenzothiazole, 2-mercaptobenzothiazole sodium salt, 2-mercapto-6-nitrobenzothiazole, 2-mercaptonaphtho[1,2-d]thiazole, 2-mercapto-5-methoxybenzothiazole, 6-amino-2-mercaptobenzothiazole, and the like. Among these, 2-mercaptobenzothiazole and di-2-benzothiazolyl disulfide are preferable because they are highly reactive.

The thiurams used in the process for producing a rubber composition of the present invention include tetramethylthiuram disulfide, tetraethylthiuram disulfide, tetrapropylthiuram disulfide, tetraisopropylthiuram disulfide, tetrabutylthiuram disulfide, tetrapentylthiuram disulfide, tetrahexylthiuram disulfide, tetraheptylthiuram disulfide, tetraoctylthiuram disulfide, tetranonylthiuram disulfide, tetradecylthiuram disulfide, tetradodecylthiuram disulfide, tetrastearylthiuram disulfide, tetrabenzylthiuram disulfide, tetrakis(2-ethylhexyl)thiuram disulfide, tetramethylthiuram monosulfide, tetraethylthiuram monosulfide, tetrapropylthiuram monosulfide, tetraisopropylthiuram monosulfide, tetrabutylthiuram monosulfide, tetrapentylthiuram monosulfide, tetrahexylthiuram monosulfide, tetraheptylthiuram monosulfide, tetraoctylthiuram monoisulfide, tetranonylthiuram monosulfide, tetradecylthiuram monosulfide, tetra dodecylthiuram monosulfide, tetrastearylthiuram monosulfide, tetrabenzylthiuram monosulfide, dipentamethylenethiuram tetrasulfide, and the like. Among these, tetrakis(2-ethylhexyl)thiuram disulfide and tetrabenzylthiuram disulfide are preferable because these are highly reactive.

The thioureas used in the process for producing a rubber composition of the present invention include N,N'-diphenylthiourea, trimethylthiourea, N,N'-diethylthiourea, N,N'-dimethylthiourea, N,N'-dibutylthiourea, ethylenethiourea, N,N'-diisopropylthiourea, N,N'-dicyclohexylthiourea, 1,3-di(o-tolyl)thiourea, 1,3-di(p-tolyl)thiourea, 1,1-diphenyl-2-thiourea, 2,5-dithiobiurea, guanylthiourea, 1-(1-naphthyl)-2-thiourea, 1-phenyl-2-thiourea, p-tolylthiourea, o-tolylthiourea, and the like. Among these, N,N'-diethylthiourea, tolylmethylthiourea, N,N'-diphenylthiourea, and N,N'-dimethylthiourea are preferable because these are highly reactive.

The dithiocarbamates used in the process for producing a rubber composition of the present invention include zinc dimethyldithiocarbamate, zinc diethyldithiocarbamate, zinc dipropyldithiocarbamate, zinc diisopropyldithiocarbamate, zinc dibutyldithiocarbamate, zinc dipentyldithiocarbamate, zinc dihexyldithiocarbamate, zinc diheptyldithiocarbamate, zinc dioctyldithiocarbamate, zinc di(2-ethylhexyl)dithiocarbamate, zinc didecyldithiocarbamate, zinc didodecyldithiocarbamate, zinc N-pentamethylenedithiocarbamate, zinc N-ethyl-N-phenyldithiocarbamate, zinc dibenzyldithiocarbamate, copper dimethyldithiocarbamate, copper diethyldithiocarbamate, copper dipropyldithiocarbamate, copper diisopropyldithiocarbamate, copper dibutyldithiocarbamate, copper dipentyldithiocarbamate, copper dihexyldithiocarbamate, copper diheptyldithiocarbamate, copper dioctyldithiocarbamate, copper di(2-ethylhexyl)dithiocarbamate, copper didecyldithiocarbamate, copper didodecyldithiocarbamate, copper N-pentamethylenedithiocarbamate, copper dibenzyldithiocarbamate, sodium dimethyldithiocarbamate, sodium diethyldithiocarbamate, sodium dipropyldithiocarbamate, sodium diisopropyldithiocarbamate, sodium dibutyldithiocarbamate, sodium dipentyldithiocarbamate, sodium dihexyldithiocarbamate, sodium diheptyldithiocarbamate, sodium dioctyldithiocarbamate, sodium di(2-ethylhexyl)dithiocarbamate, sodium didecyldithiocarbamate, sodium didodecyldithiocarbamate, sodium N-pentamethylenedithiocarbamate, sodium dibenzyldithiocarbamate, ferric dimethyldithiocarbamate, ferric diethyldithiocarbamate, ferric dipropyldithiocarbamate, ferric diisopropyldithiocarbamate, ferric dibutyldithiocarbamate, ferric dipentyldithiocarbamate, ferric dihexyldithiocarbamate, ferric diheptyldithiocarbamate, ferric dioctyldithiocarbamate, ferric di(2-ethylhexyl)dithiocarbamate, ferric didecyldithiocarbamate, ferric didodecyldithiocarbamate, ferric N-pentamethylenedithiocarbamate, ferric dibenzyldithiocarbamate, and the like. Among these, zinc dibenzyldithiocarbamate, zinc N-ethyl-N-phenyldithiocarbamate, zinc dimethyldithiocarbamate, and copper dimethyldithiocarbamate are preferable because these are highly reactive.

The xanthates used in the process for producing a rubber composition of the present invention include zinc methyl xanthate, zinc ethyl xanthate, zinc propyl xanthate, zinc isopropyl xanthate, zinc butyl xanthate, zinc pentyl xanthate, zinc hexyl xanthate, zinc heptyl xanthate, zinc octyl xanthate, zinc 2-ethylhexyl xanthate, zinc decyl xanthate, zinc dodecyl xanthate, potassium methyl xanthate, potassium ethyl xanthate, potassium propyl xanthate, potassium isopropyl xanthate, potassium butyl xanthate, potassium pentyl xanthate, potassium hexyl xanthate, potassium heptyl xanthate, potassium octyl xanthate, potassium 2-ethylhexyl xanthate, potassium decyl xanthate, potassium dodecyl xanthate, sodium methyl xanthate, sodium ethyl xanthate, sodium propyl xanthate, sodium isopropyl xanthate, sodium butyl xanthate, sodium pentyl xanthate, sodium hexyl xanthate, sodium heptyl xanthate, sodium octyl xanthate, sodium 2-ethylhexyl xanthate, sodium decyl xanthate, sodium dodecyl xanthate, and the like. Among these, zinc isopropyl xanthate is preferable because it is highly reactive.

[Rubber Component (A)]

As the synthetic dienic rubber of the rubber component (A) for use in the rubber composition production method of the present invention, usable here are styrene-butadiene copolymer rubber (SBR), polybutadiene rubber (BR), polyisoprene rubber (IR), butyl rubber (IIR), ethylene-propylene-diene tercopolymer rubber (EPDM), etc. One or more different types of natural rubbers and synthetic dienic rubbers may be used here either singly or as combined.

[Inorganic Filler (B)]

As the inorganic filler (B) for use in the rubber composition production method of the present invention, usable are silica and an inorganic compound represented by the following general formula (VIII):

$$dM^1 \cdot xSiO_y \cdot zH_2O \quad \text{(VIII)}$$

In the general formula (VIII), $M^1$ represents at least one selected from, a metal selected from aluminium, magnesium, titanium, calcium and zirconium, and oxides or hydroxides of those metals, their hydrates, or carbonates of the metals; d, x, y and z each indicate an integer of from 1 to 5, an integer of from 0 to 10, an integer of from 2 to 5, and an integer of from 0 to 10, respectively.

In the general formula (VIII), when x and z are both 0, then the inorganic compound is at least one metal selected from aluminium, magnesium, titanium, calcium and zirconium, or a metal oxide or metal hydroxide thereof.

In the present invention, silica is preferred as the inorganic filler (B) from the viewpoint of satisfying both low rolling property and abrasion resistance. As silica, any commercially-available one is usable here; and above all, preferred is precipitated silica, fumed silica or colloidal silica, and more preferred is precipitated silica. Preferably, the BET specific surface area (as measured according to ISO 5794/1) of silica for use herein is from 40 to 350 $m^2/g$. Silica of which the BET specific surface area falls within the range is advantageous in that it satisfies both rubber-reinforcing capability and dispersibility in rubber component. From this viewpoint, silica having a BET specific surface area in a range of 80 to 350 $m^2/g$ is more preferable, especially preferable being silica having a BET specific surface area in a range of 120 to 350 $m^2/g$. As such silica, there may be used commercial products such as trade name "Nipsil AQ" (BET specific surface area=220 $m^2/g$) and trade name "Nipsil KQ" produced by Tosoh Silica Corporation, and "Ultrasil VN3" (BET specific surface area=175 $m^2/g$) produced by Degussa AG, and the like.

As the inorganic compound represented by the general formula (III), usable here are alumina ($Al_2O_3$) such as γ-alumina, α-alumina, etc.; alumina monohydrate ($Al_2O_3.H_2O$) such as boehmite, diaspore, etc.; aluminium hydroxide [$Al(OH)_3$] such as gypsite, bayerite, etc.; aluminium carbonate [$Al_2(CO_3)_2$], magnesium hydroxide [$Mg(OH)_2$], magnesium oxide (MgO), magnesium carbonate ($MgCO_3$), talc ($3MgO.4SiO_2.H_2O$), attapulgite ($5MgO.8SiO_2.9H_2O$), titanium white ($TiO_2$), titanium black ($TiO_{2n-1}$), calcium oxide (CaO), calcium hydroxide [$Ca(OH)_2$], aluminium magnesium oxide ($MgO.Al_2O_3$), clay ($Al_2O_3.2SiO_2$), kaolin ($Al_2O_3.0.2SiO_2.2H_2O$), pyrophyllite ($Al_2O_3.4SiO_2.H_2O$), bentonite ($Al_2O_3.4SiO_2.2H_2O$), aluminium silicate ($Al_2SiO_5$, $Al_4.3SiO_4.5H_2O$, etc.), magnesium silicate ($Mg_2SiO_4$, $MgSiO_3$, etc.), calcium silicate ($Ca_2.SiO_4$, etc.), aluminium calcium silicate ($Al_2O_3.Ca.2SiO_2$, etc.), magnesium calcium silicate ($CaMgSiO_4$), calcium carbonate ($CaCO_3$), zirconium oxide ($ZrO_2$), zirconium hydroxide [$ZrO(OH)_2.nH_2O$], zirconium carbonate [$Zr(CO_3)_2$]; as well as crystalline aluminosilicate salts containing a charge-correcting hydrogen, alkali metal or alkaline earth metal such as various types of zeolite. Also, it is preferable when $M^1$ in the general formula (VIII) is at least one selected from an aluminum metal, an oxide or a hydroxide of aluminum or a hydrate thereof, or a carbonate of aluminum. Among these, aluminum hydroxide is especially preferable.

One or more different types of the inorganic compounds of the general formula (VIII) may be used here either singly or as combined. The mean particle size of the inorganic compound is preferably within a range of from 0.01 to 10 μm from the viewpoint of the balance of kneading workability, abrasion resistance and wet grip performance, and more preferably within a range of from 0.05 to 5 μm.

As the inorganic filler (B) in the present invention, silica alone may be used, or silica as combined with at least one inorganic compound of the general formula (VIII) may be used.

If desired, the filler in the rubber composition in the present invention may contain carbon black in addition to the above-mentioned inorganic filler (B). Containing carbon black, the filler enjoys the effect of lowering the electric resistance of the rubber composition to thereby prevent static electrification thereof. Carbon black for use herein is not specifically defined. For example, preferred is use of high, middle or low-structure SAF, ISAF, IISAF, N339, HAF, FEF, GPF, SRF-grade carbon black; and more preferred is use of SAF, ISAF, IISAF, N339, HAF, FEF-grade carbon black. Preferably, the nitrogen adsorption specific surface area ($N_2SA$, as measured according to JIS K 6217-2:2001) of such carbon black is from 30 to 250 $m^2/g$. One alone or two or more different types of such carbon black may be used here either singly or as combined. In the present invention, the inorganic filler (B) does not contain carbon black.

The inorganic filler (B) in the rubber composition in the present invention is preferably in an amount of from 20 to 120 parts by mass relative to 100 parts by mass of the rubber component (A). When the amount is at least 20 parts by mass, then it is favorable from the viewpoint of securing wet performance; and when at most 120 parts by mass, then it is favorable from the viewpoint of reducing rolling resistance. Further, the amount is more preferably from 30 to 100 parts by mass.

Also preferably, the filler in the rubber composition in the present invention is in an amount of from 20 to 150 parts by mass relative to 100 parts by mass of the rubber component (A). When the amount is at least 20 parts by mass, then it is favorable from the viewpoint of enhancing rubber composition reinforcing capability; and when at most 150 parts by mass, then it is favorable from the viewpoint of reducing rolling resistance.

Of the filler, the inorganic filler (B) accounts for, from the viewpoint of a balance between the wet performance and the rolling resistance, preferably 40 mass % or more and more preferably 70 mass % or more.

[Organic Acid Compound (G)]

In the production process of the present invention, the number of molecules (number of moles) of the organic acid compound (G) contained in the rubber composition in the first stage (X) of kneading or a stage (Y) of kneading is preferably not more than the number of molecules (number of moles) of the agent (D) added in the first stage (X) or the stage (Y). This is in order to suitably suppress reduction of the effect of activity improvement, the reduction occurring when the number of molecules (number of moles) of the organic acid compound (G) is more than the number of molecules (number of moles) of the chemical agents (D) and (E).

In the present invention, the organic acid compound (G) is preferably added in a stage of kneading after addition of the silane coupling agent (C) {that is, in the stage (Y) of kneading or the last stage (Z) of kneading}. This is in order to further enhance the effect of improving the coupling activity, obtained by blending of the chemical agents (D) and (E).

The organic acid compound (G) blended in the rubber composition of the present invention includes organic acids such as saturated fatty acids, unsaturated fatty acids, resin acids such as rosin acids or modified rosin acids, and the like including stearic acid, palmitic acid, myristic acid, lauric acid, arachidic acid, behenic acid, lignoceric acid, capric acid, pelargonic acid, caprylic acid, enanthic acid, caproic acid, oleic acid, vaccenic acid, linoleic acid, linolenic acid, nervonic acid, and the like; and alkali metal salts or esters of the saturated fatty acids, the unsaturated fatty acids, and the resin acids. As the alkali metals, preferable are sodium, potassium, and the like.

In the present invention, 50 mol % or more of the organic acid compound (G) is preferably stearic acid because the compound has to sufficiently exhibit its function as a vulcanization accelerating aid.

Further, when an emulsion-polymerized styrene-butadiene copolymer is used as a portion or all of the rubber component (A), it is preferable, from the viewpoint of an emulsifier necessary to obtain the emulsion-polymerized styrene-butadiene copolymer, that 50 mol % or more of the organic acid compound is accounted for by the rosin acids (including the modified rosin acids) and/or fatty acids which are contained in the emulsion-polymerized styrene-butadiene copolymer.

In the rubber composition production method of the present invention, various additives that are generally incorporated in a rubber composition, for example, a vulcanization activator such as zinc flower or the like, an antioxidant and others may be optionally added and kneaded in the first stage or the final stage of kneading, or in the intermediate stage between the first stage and the final stage.

As the kneading apparatus for the production method of the present invention, usable is any of a Banbury mixer, a roll, an intensive mixer, etc.

EXAMPLES

The present invention is described in more detail with reference to the following Examples; however, the present invention is not limited at all by the following Examples.

Low-heat-generating property (tan δ index) was evaluated according to the following method.
Low-Heat-Generation Property (tan δ Index)

Using a viscoelasticity measuring device (by Rheometric), tan δ of the rubber composition sample was measured at a temperature of 60° C., at a dynamic strain of 5% and at a frequency of 15 Hz. Taking the reciprocal of tan δ in Comparative Example 1, 10 or 17 as 100, the data were expressed as index indication according to the following formula. The samples having a larger index value have a better low-heat-generation property and have a smaller hysteresis loss.

Low heat generation index={(tan δ of vulcanized rubber composition of Comparative Example 1)/(tan δ of vulcanized rubber composition tested)}×100

Production Example 1

Production of Silane Coupling Agent Represented by Average Compositional Formula $(CH_3CH_2O)_3Si-(CH_2)_3-S-(CH_2)_6-S_{2.5}-(CH_2)_6-S-(CH_2)_3-Si(OCH_2CH_3)_3$ 119 g (0.5 mol) of 3-mercaptopropyltriethoxysilane was put into a 2-liter separable flask equipped with a nitrogen-introducing duct, a thermometer, a Dimroth condenser and a dropping funnel, and with stirring, 151.2 g (0.45 mol) of an ethanol solution of sodium ethoxide having an effective ingredient concentration of 20% was added thereto. Subsequently, this was heated up to 80° C. and stirred for 3 hours. Afterwards, this was cooled and transferred into a dropping funnel.

Next, 69.75 g (0.45 mol) of 1,6-dichlorohexane was put into a separable flask similar to the above, heated up to 80° C., and the reaction product of 3-mercaptopropyltriethoxysilane and sodium ethoxide was slowly and dropwise added thereto. After the addition, this was stirred for 5 hours at 80° C. Subsequently, this was cooled, and salt was separated from the obtained solution through filtration, and ethanol and excessive 1,6-dichlorohexane were removed therefrom through reduced-pressure distillation. The solution obtained was distilled under reduced pressure to obtain 137.7 g of a colorless transparent liquid with a boiling point of 148 to 150° C./0.005 tort As a result of IR analysis, $^1$H-NMR analysis and mass spectrometry analysis (MS analysis), the product was a compound represented by $(CH_3CH_2O)_3Si-(CH_2)_3S-(CH_2)_6-Cl$. Through gas chromatography analysis (GC analysis), the purity of the compound was 97.5%.

Next, 80 g of ethanol, 5.46 g (0.07 mol) of anhydrous sodium sulfide and 3.36 g (0.105 mol) of sulfur were put into the same 0.5-liter separable flask as above, and heated up to 80° C. With stirring the solution, 49.91 g (0.14 mol) of the above $(CH_3CH_2O)_3Si-(CH_2)_3-S-(CH_2)_6-Cl$ was gradually and dropwise added thereto. After the addition, this was stirred for 10 hours at 80° C. After the stirring, this was cooled, the formed salt was taken out through filtration, and then the solvent ethanol was evaporated away under reduced pressure. The obtained, red-brown transparent solution was analyzed through IR analysis, $^1$H-NMR analysis and ultra-critical chromatography analysis, which confirmed that the product is a compound represented by an average compositional formula, $(CH_3CH_2O)_3Si-(CH_2)_3-S-(CH_2)_6-S_{2.5}-(CH_2)_6-S-(CH_2)_3-Si(OCH_2CH_3)_3$. In GPC analysis, the purity of the product was 85.2%.

Examples 1 to 205 and Comparative Examples 1 to 16

According to the compounding recipes and kneading methods shown in Tables 1 to 8, rubber components, silica, and silane coupling agents were kneaded in the first stage (X) of kneading. In each stage of the kneading, a Banbury mixer was used for kneading.

In Tables 1 to 3, the maximum temperature of the rubber compositions was adjusted to the temperature shown in the Tables. Further, among the rubber compositions in Tables 4 to 8, when the temperature of the rubber composition when the chemical agents were added during the first stage (X) was 145 or 150° C., the maximum temperature of the rubber composition in the first stage (X) of kneading was adjusted to 155° C. in order to secure time for kneading the chemical agents which would be added later. However, in all other cases, the maximum temperature of the rubber composition in the first stage (X) of kneading was adjusted to 150° C.

In Examples and Comparative Examples in Table 4, the maximum temperature of every rubber composition in the stage (Y) of kneading was adjusted so that it became 150° C.

Additionally, in Comparative Example 16, kneading was carried out in the second stage of kneading without addition of the chemical agents.

The low heat-generating properties (tan δ indices) of the 221 rubber compositions obtained were evaluated according to the method mentioned above. The results are shown in Tables 1 to 8.

TABLE 1

| Mass parts | | | | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|---|
| | | | | Example | | | | | | | | | | | | | | |
| Compounding ingredients | First stage of kneading | Emulsion-polymerized SBR-1 *1 | | 100 | 100 | 100 | 100 | 100 | 100 | 100 | 100 | 100 | 100 | 100 | 100 | 100 | 100 | 100 |
| | | Carbon black-1 N220 *2 | | 10 | 10 | 10 | 10 | 10 | 10 | 10 | 10 | 10 | 10 | 10 | 10 | 10 | 10 | 10 |
| | | Silica *3 | | 50 | 50 | 50 | 50 | 50 | 50 | 50 | 50 | 50 | 50 | 50 | 50 | 50 | 50 | 50 |
| | | Silane coupling agent Si75 *4 | | 4 | 4 | 4 | 4 | 4 | 4 | 4 | 4 | 4 | 4 | 4 | 4 | 4 | 4 | 4 |
| | | Aromatic oil | | 30 | 30 | 30 | 30 | 30 | 30 | 30 | 30 | 30 | 30 | 30 | 30 | 30 | 30 | 30 |
| | | Stearic acid | | 2 | 2 | 2 | 2 | 2 | 2 | 2 | 2 | 2 | 2 | 2 | 2 | 2 | 2 | 2 |
| | | Antioxidant 6PPD *5 | | 1 | 1 | 1 | 1 | 1 | 1 | 1 | 1 | 1 | 1 | 1 | 1 | 1 | 1 | 1 |
| | | 1,3-Diphenylguanidine *6 | | 1 | 1 | 1 | 1 | 1 | 1 | 1 | — | — | — | — | — | — | — | — |
| | | 2-Mercaptobenzothiazole *7 | | 0.6 | — | — | — | — | — | — | 0.6 | 0.6 | 0.6 | 0.6 | 0.6 | — | — | — |
| | | Di-2-benzothiazolyl disulfide *8 | | — | 1 | — | — | — | — | — | — | — | — | — | — | 1 | 1 | 1 |
| | | N-cyclohexyl-2-benzothiazolylsulfenamide *9 | | — | — | 1 | — | — | — | — | — | 1 | — | — | — | 1 | — | — |
| | | Tetrakis(2-ethylhexyl)thiuram disulfide *10 | | — | — | — | 1 | — | — | — | — | — | 1 | — | — | — | 1 | — |
| | | N,N'-diethylthiourea *11 | | — | — | — | — | 1 | — | — | — | — | — | 1 | — | — | — | 1 |
| | | Zinc dibenzyldithiocarbamate *12 | | — | — | — | — | — | 1 | — | — | — | — | — | 1 | — | — | — |
| | | Zinc isopropyl xanthate *13 | | — | — | — | — | — | — | 1 | — | — | — | — | 1 | — | — | — |
| | Last stage of kneading | Antioxidant TMDQ *14 | | 1 | 1 | 1 | 1 | 1 | 1 | 1 | 1 | 1 | 1 | 1 | 1 | 1 | 1 | 1 |
| | | Zinc flower | | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| | | 1,3-Diphenylguanidine *6 | | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| | | Vulcanization accelerator MBTS *8 | | 1 | 1 | 1 | 1 | 1 | 1 | 1 | 1 | 1 | 1 | 1 | 1 | 1 | 1 | 1 |
| | | Vulcanization accelerator TBBS *15 | | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| | | Sulfur | | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Maximum temperature of rubber composition in first stage of kneading (° C.) | | | | 150 | 150 | 150 | 150 | 150 | 150 | 150 | 150 | 150 | 150 | 150 | 150 | 150 | 150 | 150 |
| Property of vulcanized material: tan δ index | | | | 132 | 125 | 126 | 131 | 123 | 134 | 134 | 128 | 134 | 124 | 135 | 134 | 122 | 130 | 120 |

| Mass parts | | | | | 16 | 17 | 18 | 19 | 20 | 21 | 22 | 23 | 24 | 25 | 26 | 27 |
|---|---|---|---|---|---|---|---|---|---|---|---|---|---|---|---|---|
| | | | | | Example | | | | | | | | | | | |
| Compounding ingredients | First stage of kneading | Emulsion-polymerized SBR-1 *1 | | | 100 | 100 | 100 | 100 | 100 | 100 | 100 | 100 | 100 | 100 | 100 | 100 |
| | | Carbon black-1 N220 *2 | | | 10 | 10 | 10 | 10 | 10 | 10 | 10 | 10 | 10 | 10 | 10 | 10 |
| | | Silica *3 | | | 50 | 50 | 50 | 50 | 50 | 50 | 50 | 50 | 50 | 50 | 50 | 50 |
| | | Silane coupling agent Si75 *4 | | | 4 | 4 | 4 | 4 | 4 | 4 | 4 | 4 | 4 | 4 | 4 | 4 |
| | | Aromatic oil | | | 30 | 30 | 30 | 30 | 30 | 30 | 30 | 30 | 30 | 30 | 30 | 30 |
| | | Stearic acid | | | 2 | 2 | 2 | 2 | 2 | 2 | 2 | 2 | 2 | 2 | 2 | 2 |
| | | Antioxidant 6PPD *5 | | | 1 | 1 | 1 | 1 | 1 | 1 | 1 | 1 | 1 | 1 | 1 | 1 |
| | | 1,3-Diphenylguanidine *6 | | | — | — | — | — | — | — | — | — | — | — | — | — |
| | | 2-Mercaptobenzothiazole *7 | | | — | — | — | — | — | — | — | — | — | — | — | — |
| | | Di-2-benzothiazolyl disulfide *8 | | | 1 | 1 | — | — | — | — | — | — | — | — | — | — |

TABLE 1-continued

|  |  |  |  |  |  |  |  |  |  |  |  |  |  |
|---|---|---|---|---|---|---|---|---|---|---|---|---|---|
|  |  | N-cyclohexyl-2-benzothiazolyl-sulfenamide *9 | — | — | 1 | 1 | 1 | 1 | — | — | — | — | — | — |
|  |  | Tetrakis(2-ethylhexyl)thiuram disulfide *10 | — | — | 1 | — | — | — | 1 | 1 | 1 | — | — | — |
|  |  | N,N'-diethylthiourea *11 | — | — | — | 1 | — | — | 1 | — | — | 1 | 1 | — |
|  |  | Zinc dibenzyldithiocarbamate *12 | 1 | — | — | — | 1 | — | — | 1 | — | 1 | — | 1 |
|  |  | Zinc isopropyl xanthate *13 | — | 1 | — | — | — | 1 | — | 1 | — | 1 | 1 | — |
|  | Last stage of kneading | Antioxidant TMDQ *14 | 1 | 1 | 1 | 1 | 1 | 1 | 1 | 1 | 1 | 1 | 1 | 1 |
|  |  | Zinc flower | 2.5 | 2.5 | 2.5 | 2.5 | 2.5 | 2.5 | 2.5 | 2.5 | 2.5 | 2.5 | 2.5 | 2.5 |
|  |  | 1,3-Diphenylguanidine *6 | 0.6 | 0.6 | 0.6 | 0.6 | 0.6 | 0.6 | 0.6 | 0.6 | 0.6 | 0.6 | 0.6 | 0.6 |
|  |  | Vulcanization accelerator MBTS *8 | 1 | 1 | 1 | 1 | 1 | 1 | 1 | 1 | 1 | 1 | 1 | 1 |
|  |  | Vulcanization accelerator TBBS *15 | 0.6 | 0.6 | 0.6 | 0.6 | 0.6 | 0.6 | 0.6 | 0.6 | 0.6 | 0.6 | 0.6 | 0.6 |
|  |  | Sulfur | 1.5 | 1.5 | 1.5 | 1.5 | 1.5 | 1.5 | 1.5 | 1.5 | 1.5 | 1.5 | 1.5 | 1.5 |
| Maximum temperature of rubber composition in first stage of kneading (° C.) |  |  | 150 | 150 | 150 | 150 | 150 | 150 | 150 | 150 | 150 | 150 | 150 | 150 |
| Property of vulcanized material: tan δ index |  |  | 129 | 128 | 128 | 120 | 129 | 127 | 126 | 136 | 133 | 122 | 121 | 138 |

TABLE 2

|  |  |  | Comparative Example |  |  |  |  |  |  |  |  |
|---|---|---|---|---|---|---|---|---|---|---|---|
|  |  | Mass parts | 1 | 2 | 3 | 4 | 5 | 6 | 7 | 8 | 9 |
| Compounding ingredients | First stage of kneading | Emulsion-polymerized SBR-1 *1 | 100 | 100 | 100 | 100 | 100 | 100 | 100 | 100 | 100 |
|  |  | Carbon black-1 N220 *2 | 10 | 10 | 10 | 10 | 10 | 10 | 10 | 10 | 10 |
|  |  | Silica *3 | 50 | 50 | 50 | 50 | 50 | 50 | 50 | 50 | 50 |
|  |  | Silane coupling agent Si75 *4 | 4 | 4 | 4 | 4 | 4 | 4 | 4 | 4 | 4 |
|  |  | Aromatic oil | 30 | 30 | 30 | 30 | 30 | 30 | 30 | 30 | 30 |
|  |  | Stearic acid | 2 | 2 | 2 | 2 | 2 | 2 | 2 | 2 | 2 |
|  |  | Antioxidant 6PPD *5 | 1 | 1 | 1 | 1 | 1 | 1 | 1 | 1 | 1 |
|  |  | 1,3-Diphenylguanidine *6 | — | 1 | — | — | — | — | — | — | — |
|  |  | 2-Mercaptobenzothiazole *7 | — | — | 0.6 | — | — | — | — | — | — |
|  |  | Di-2-benzothiazolyl disulfide *8 | — | — | — | 1 | — | — | — | — | — |
|  |  | N-cyclohexyl-2-benzothiazolyl-sulfenamide *9 | — | — | — | — | 1 | — | — | — | — |
|  |  | Tetrakis(2-ethylhexyl)thiuram disulfide *10 | — | — | — | — | — | 1 | — | — | — |
|  |  | N,N'-diethylthiourea *11 | — | — | — | — | — | — | 1 | — | — |
|  |  | Zinc dibenzyldithiocarbamate *12 | — | — | — | — | — | — | — | 1 | — |
|  |  | Zinc isopropyl xanthate *13 | — | — | — | — | — | — | — | — | 1 |
|  | Last stage of kneading | Antioxidant TMDQ *14 | 1 | 1 | 1 | 1 | 1 | 1 | 1 | 1 | 1 |
|  |  | Zinc flower | 2.5 | 2.5 | 2.5 | 2.5 | 2.5 | 2.5 | 2.5 | 2.5 | 2.5 |
|  |  | 1,3-Diphenylguanidine *6 | 0.6 | 0.6 | 0.6 | 0.6 | 0.6 | 0.6 | 0.6 | 0.6 | 0.6 |
|  |  | Vulcanization accelerator MBTS *8 | 1 | 1 | 1 | 1 | 1 | 1 | 1 | 1 | 1 |
|  |  | Vulcanization accelerator TBBS *15 | 0.6 | 0.6 | 0.6 | 0.6 | 0.6 | 0.6 | 0.6 | 0.6 | 0.6 |
|  |  | Sulfur | 1.5 | 1.5 | 1.5 | 1.5 | 1.5 | 1.5 | 1.5 | 1.5 | 1.5 |
| Maximum temperature of rubber composition in first stage of kneading (° C.) |  |  | 150 | 150 | 150 | 150 | 150 | 150 | 150 | 150 | 150 |
| Property of vulcanized material: tan δ index |  |  | 100 | 112 | 105 | 101 | 107 | 105 | 102 | 105 | 103 |

TABLE 3

| | | Mass parts | Example | | | | | | | | | | | | | | |
|---|---|---|---|---|---|---|---|---|---|---|---|---|---|---|---|---|---|
| | | | 1 | 28 | 29 | 30 | 31 | 4 | 32 | 33 | 34 | 6 | 35 | 36 | 37 | 38 |
| Compounding ingredients | First stage of kneading | Emulsion-polymerized SBR-1 *1 | 100 | 100 | 100 | 100 | 100 | 100 | 100 | 100 | 100 | 100 | 100 | 100 | 100 | 100 |
| | | Carbon black-1 N220 *2 | 10 | 10 | 10 | 10 | 10 | 10 | 10 | 10 | 10 | 10 | 10 | 10 | 10 | 10 |
| | | Silica *3 | 50 | 50 | 50 | 50 | 50 | 50 | 50 | 50 | 50 | 50 | 50 | 50 | 50 | 50 |
| | | Silane coupling agent Si75 *4 | 4 | 4 | 4 | 4 | 4 | 4 | 4 | 4 | 4 | 4 | 4 | 4 | 4 | 4 |
| | | Aromatic oil | 30 | 30 | 30 | 30 | 30 | 30 | 30 | 30 | 30 | 30 | 30 | 30 | 30 | 30 |
| | | Stearic acid | 2 | 2 | 2 | 2 | 2 | 2 | 2 | 2 | 2 | 2 | 2 | 2 | 2 | 2 |
| | | Antioxidant 6PPD *5 | 1 | 1 | 1 | 1 | 1 | 1 | 1 | 1 | 1 | 1 | 1 | 1 | 1 | 1 |
| | | 1,3-Diphenylguanidine *6 | 1 | 1 | 1 | 1 | 1 | 1 | 1 | 1 | 1 | 1 | 1 | 1 | 1 | 1 |
| | | 2-Mercaptobenzothiazole *7 | — | 0.6 | 0.6 | 0.6 | 0.6 | — | — | — | — | — | — | — | — | — |
| | | Tetrakis(2-ethylhexyl)thiuram disulfide *10 | — | — | — | — | — | — | 1 | 1 | 1 | — | — | — | — | — |
| | | Zinc dibenzyldithiocarbamate *12 | — | — | — | — | — | — | — | — | — | — | 1 | 1 | 1 | 1 |
| | | Zinc isopropyl xanthate *13 | — | — | — | — | — | — | — | — | — | — | — | — | — | — |
| | Last stage of kneading | Antioxidant TMDQ *14 | 1 | 1 | 1 | 1 | 1 | 1 | 1 | 1 | 1 | 1 | 1 | 1 | 1 | 1 |
| | | Zinc flower | 2.5 | 2.5 | 2.5 | 2.5 | 2.5 | 2.5 | 2.5 | 2.5 | 2.5 | 2.5 | 2.5 | 2.5 | 2.5 | 2.5 |
| | | 1,3-Diphenylguanidine *6 | 0.6 | 0.6 | 0.6 | 0.6 | 0.6 | 0.6 | 0.6 | 0.6 | 0.6 | 0.6 | 0.6 | 0.6 | 0.6 | 0.6 |
| | | Vulcanization accelerator MBTS *8 | 1 | 1 | 1 | 1 | 1 | 1 | 1 | 1 | 1 | 1 | 1 | 1 | 1 | 1 |
| | | Vulcanization accelerator TBBS *15 | 0.6 | 0.6 | 0.6 | 0.6 | 0.6 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 | 1.5 | 1.5 | 1.5 | 1.5 | 1.5 |
| Maximum temperature of rubber composition in first stage of kneading (° C.) | | | 150 | 115 | 125 | 140 | 170 | 150 | 125 | 140 | 170 | 150 | 115 | 125 | 140 | 170 |
| Property of vulcanized material: tan δ index | | | 132 | 118 | 125 | 129 | 141 | 131 | 120 | 127 | 140 | 134 | 115 | 121 | 128 | 135 |

| | | Mass parts | Example | | | | | | | | | | | |
|---|---|---|---|---|---|---|---|---|---|---|---|---|---|---|
| | | | 9 | 39 | 40 | 41 | 11 | 42 | 43 | 44 | 12 | 45 | 46 | 47 |
| Compounding ingredients | First stage of kneading | Emulsion-polymerized SBR-1 *1 | 100 | 100 | 100 | 100 | 100 | 100 | 100 | 100 | 100 | 100 | 100 | 100 |
| | | Carbon black-1 N220 *2 | 10 | 10 | 10 | 10 | 10 | 10 | 10 | 10 | 10 | 10 | 10 | 10 |
| | | Silica *3 | 50 | 50 | 50 | 50 | 50 | 50 | 50 | 50 | 50 | 50 | 50 | 50 |
| | | Silane coupling agent Si75 *4 | 4 | 4 | 4 | 4 | 4 | 4 | 4 | 4 | 4 | 4 | 4 | 4 |
| | | Aromatic oil | 30 | 30 | 30 | 30 | 30 | 30 | 30 | 30 | 30 | 30 | 30 | 30 |
| | | Stearic acid | 2 | 2 | 2 | 2 | 2 | 2 | 2 | 2 | 2 | 2 | 2 | 2 |
| | | Antioxidant 6PPD *5 | 1 | 1 | 1 | 1 | 1 | 1 | 1 | 1 | 1 | 1 | 1 | 1 |
| | | 1,3-Diphenylguanidine *6 | — | — | — | — | — | — | — | — | — | — | — | — |
| | | 2-Mercaptobenzothiazole *7 | 0.6 | 0.6 | 0.6 | 0.6 | 0.6 | 0.6 | 0.6 | 0.6 | 0.6 | 0.6 | 0.6 | 0.6 |
| | | Tetrakis(2-ethylhexyl)thiuram disulfide *10 | 1 | 1 | 1 | 1 | — | — | — | — | — | — | — | — |
| | | Zinc dibenzyldithiocarbamate *12 | — | — | — | — | 1 | 1 | 1 | 1 | — | — | — | — |
| | | Zinc isopropyl xanthate *13 | — | — | — | — | — | — | — | — | 1 | 1 | 1 | 1 |
| | Last stage of kneading | Antioxidant TMDQ *14 | 1 | 1 | 1 | 1 | 1 | 1 | 1 | 1 | 1 | 1 | 1 | 1 |
| | | Zinc flower | 2.5 | 2.5 | 2.5 | 2.5 | 2.5 | 2.5 | 2.5 | 2.5 | 2.5 | 2.5 | 2.5 | 2.5 |
| | | 1,3-Diphenylguanidine *6 | 0.6 | 0.6 | 0.6 | 0.6 | 0.6 | 0.6 | 0.6 | 0.6 | 0.6 | 0.6 | 0.6 | 0.6 |
| | | Vulcanization accelerator MBTS *8 | 1 | 1 | 1 | 1 | 1 | 1 | 1 | 1 | 1 | 1 | 1 | 1 |
| | | Vulcanization accelerator TBBS *15 | 0.6 | 0.6 | 0.6 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 | 1.5 | 1.5 | 1.5 |
| Maximum temperature of rubber composition in first stage of kneading (° C.) | | | 150 | 125 | 140 | 170 | 150 | 125 | 140 | 170 | 150 | 125 | 140 | 170 |
| Property of vulcanized material: tan δ index | | | 134 | 129 | 132 | 135 | 135 | 130 | 133 | 136 | 134 | 130 | 133 | 134 |

TABLE 4

| | | Mass parts | Example |||||||||||
|---|---|---|---|---|---|---|---|---|---|---|---|---|
| | | | 23 | 48 | 49 | 50 | 51 | 24 | 52 | 53 | 54 | 27 | 55 |
| Compounding ingredients | First stage of kneading | Emulsion-polymerized SBR-1 *1 | 100 | 100 | 100 | 100 | 100 | 100 | 100 | 100 | 100 | 100 | 100 |
| | | Carbon black-1 N220 *2 | 10 | 10 | 10 | 10 | 10 | 10 | 10 | 10 | 10 | 10 | 10 |
| | | Silica *3 | 50 | 50 | 50 | 50 | 50 | 50 | 50 | 50 | 50 | 50 | 50 |
| | | Silane coupling agent Si75 *4 | 4 | 4 | 4 | 4 | 4 | 4 | 4 | 4 | 4 | 4 | 4 |
| | | Aromatic oil | 30 | 30 | 30 | 30 | 30 | 30 | 30 | 30 | 30 | 30 | 30 |
| | | Stearic acid | 2 | 2 | 2 | 2 | 2 | 2 | 2 | 2 | 2 | 2 | 2 |
| | | Antioxidant 6PPD *5 | 1 | 1 | 1 | 1 | 1 | 1 | 1 | 1 | 1 | 1 | 1 |
| | | 1,3-Diphenylguanidine *6 | — | — | — | — | — | — | — | — | — | — | — |
| | | 2-Mercaptobenzothiazole *7 | — | — | — | — | — | — | — | — | — | — | — |
| | | Tetrakis(2-ethylhexyl)thiuram disulfide *10 | 1 | 1 | 1 | 1 | 1 | 1 | 1 | 1 | 1 | — | — |
| | | Zinc dibenzyldithiocarbamate *12 | 1 | 1 | 1 | 1 | 1 | — | — | — | — | 1 | 1 |
| | | Zinc isopropyl xanthate *13 | — | — | — | — | — | 1 | 1 | 1 | 1 | 1 | 1 |
| | Last stage of kneading | Antioxidant TMDQ *14 | 1 | 1 | 1 | 1 | 1 | 1 | 1 | 1 | 1 | 1 | 1 |
| | | Zinc flower | 2.5 | 2.5 | 2.5 | 2.5 | 2.5 | 2.5 | 2.5 | 2.5 | 2.5 | 2.5 | 2.5 |
| | | 1,3-Diphenylguanidine *6 | 0.6 | 0.6 | 0.6 | 0.6 | 0.6 | 0.6 | 0.6 | 0.6 | 0.6 | 0.6 | 0.6 |
| | | Vulcanization accelerator MBTS *8 | 1 | 1 | 1 | 1 | 1 | 1 | 1 | 1 | 1 | 1 | 1 |
| | | Vulcanization accelerator TBBS *15 | 0.6 | 0.6 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 | 1.5 | 1.5 |
| Maximum temperature of rubber composition in first stage of kneading (° C.) | | | 150 | 115 | 125 | 140 | 170 | 150 | 125 | 140 | 170 | 150 | 115 |
| Property of vulcanized material: tan δ index | | | 136 | 118 | 124 | 132 | 144 | 133 | 122 | 129 | 138 | 138 | 119 |

| | | Mass parts | Example ||| Comparative Example |||||
|---|---|---|---|---|---|---|---|---|---|---|
| | | | 56 | 57 | 58 | 1 | 2 | 3 | 6 | 8 | 9 |
| Compounding ingredients | First stage of kneading | Emulsion-polymerized SBR-1 *1 | 100 | 100 | 100 | 100 | 100 | 100 | 100 | 100 | 100 |
| | | Carbon black-1 N220 *2 | 10 | 10 | 10 | 10 | 10 | 10 | 10 | 10 | 10 |
| | | Silica *3 | 50 | 50 | 50 | 50 | 50 | 50 | 50 | 50 | 50 |
| | | Silane coupling agent Si75 *4 | 4 | 4 | 4 | 4 | 4 | 4 | 4 | 4 | 4 |
| | | Aromatic oil | 30 | 30 | 30 | 30 | 30 | 30 | 30 | 30 | 30 |
| | | Stearic acid | 2 | 2 | 2 | 2 | 2 | 2 | 2 | 2 | 2 |
| | | Antioxidant 6PPD *5 | 1 | 1 | 1 | 1 | 1 | 1 | 1 | 1 | 1 |
| | | 1,3-Diphenylguanidine *6 | — | — | — | — | 1 | — | — | — | — |
| | | 2-Mercaptobenzothiazole *7 | — | — | — | — | — | 0.6 | — | — | — |
| | | Tetrakis(2-ethylhexyl)thiuram disulfide *10 | — | — | — | — | — | — | — | 1 | — |
| | | Zinc dibenzyldithiocarbamate *12 | 1 | 1 | 1 | — | — | — | — | 1 | — |
| | | Zinc isopropyl xanthate *13 | 1 | 1 | 1 | — | — | — | — | — | 1 |
| | Last stage of kneading | Antioxidant TMDQ *14 | 1 | 1 | 1 | 1 | 1 | 1 | 1 | 1 | 1 |
| | | Zinc flower | 2.5 | 2.5 | 2.5 | 2.5 | 2.5 | 2.5 | 2.5 | 2.5 | 2.5 |
| | | 1,3-Diphenylguanidine *6 | 0.6 | 0.6 | 0.6 | 0.6 | 0.6 | 0.6 | 0.6 | 0.6 | 0.6 |
| | | Vulcanization accelerator MBTS *8 | 1 | 1 | 1 | 1 | 1 | 1 | 1 | 1 | 1 |
| | | Vulcanization accelerator TBBS *15 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 |
| Maximum temperature of rubber composition in first stage of kneading (° C.) | | | 125 | 140 | 170 | 150 | 150 | 150 | 150 | 150 | 150 |
| Property of vulcanized material: tan δ index | | | 128 | 133 | 145 | 100 | 112 | 105 | 105 | 105 | 103 |

TABLE 5

| | | Mass parts | Example | | | | | | | | | | |
|---|---|---|---|---|---|---|---|---|---|---|---|---|---|
| | | | 59 | 60 | 61 | 62 | 63 | 64 | 65 | 66 | 67 | 68 | 69 |
| Compounding ingredients | First stage of kneading | Emulsion-polymerized SBR-2 *16 | 68.75 | 68.75 | 68.75 | 68.75 | 68.75 | 68.75 | 68.75 | 68.75 | 68.75 | 68.75 | 68.75 |
| | | Solution-polymerized SBR-1 *17 | 68.75 | 68.75 | 68.75 | 68.75 | 68.75 | 68.75 | 68.75 | 68.75 | 68.75 | 68.75 | 68.75 |
| | | Carbon black-1 N220 *2 | 10 | 10 | 10 | 10 | 10 | 10 | 10 | 10 | 10 | 10 | 10 |
| | | Silica *3 | 80 | 80 | 80 | 80 | 80 | 80 | 80 | 80 | 80 | 80 | 80 |
| | | Silane coupling agent Si75 *4 | 6.5 | — | — | — | 6.5 | — | — | — | 6.5 | — | — |
| | | Silane coupling agent NXT *18 | — | 6.5 | — | — | — | 6.5 | — | — | — | 6.5 | — |
| | | Silane coupling agent NXT-Z *19 | — | — | 6.5 | — | — | — | 6.5 | — | — | — | 6.5 |
| | | Silane coupling agent *20 | — | — | — | 6.5 | — | — | — | 6.5 | — | — | — |
| | | Aromatic oil | 5 | 5 | 5 | 5 | 5 | 5 | 5 | 5 | 5 | 5 | 5 |
| | | Stearic acid | 2 | 2 | 2 | 2 | 2 | 2 | 2 | 2 | 2 | 2 | 2 |
| | | Antioxidant 6PPD *5 | 1 | 1 | 1 | 1 | 1 | 1 | 1 | 1 | 1 | 1 | 1 |
| | | 1,3-Diphenylguanidine *6 | 1 | 1 | 1 | 1 | 1 | 1 | 1 | 1 | 1 | 1 | 1 |
| | | 2-Mercaptobenzothiazole *7 | 0.7 | 0.7 | 0.7 | 0.7 | — | — | — | — | — | — | — |
| | | Tetrakis(2-ethylhexyl)thiuram disulfide *10 | — | — | — | — | 1 | 1 | 1 | 1 | — | — | — |
| | | Zinc dibenzyldithiocarbamate *12 | — | — | — | — | — | — | — | — | 1 | 1 | 1 |
| | | Zinc isopropyl xanthate *13 | — | — | — | — | — | — | — | — | — | — | — |
| | Last stage of kneading | Zinc flower | 3 | 3 | 3 | 3 | 3 | 3 | 3 | 3 | 3 | 3 | 3 |
| | | 1,3-Diphenylguanidine *6 | 1 | 1 | 1 | 1 | 1 | 1 | 1 | 1 | 1 | 1 | 1 |
| | | Vulcanization accelerator MBTS *8 | 0.8 | 0.8 | 0.8 | 0.8 | 0.8 | 0.8 | 0.8 | 0.8 | 0.8 | 0.8 | 0.8 |
| | | Vulcanization accelerator TBBS *15 | 1.5 | 1.5 | 1.5 | 1.5 | 1.5 | 1.5 | 1.5 | 1.5 | 1.5 | 1.5 | 1.5 |
| | | Sulfur | 1.5 | 1.5 | 1.5 | 1.5 | 1.5 | 1.5 | 1.5 | 1.5 | 1.5 | 1.5 | 1.5 |
| Maximum temperature of rubber composition in first stage of kneading (° C.) | | | 150 | 150 | 150 | 150 | 150 | 150 | 150 | 150 | 150 | 150 | 150 |
| Property of vulcanized material: tan δ index | | | 128 | 133 | 134 | 140 | 130 | 138 | 136 | 145 | 133 | 139 | 142 |

| | | Mass parts | Example | | | | | | | | |
|---|---|---|---|---|---|---|---|---|---|---|---|
| | | | 70 | 71 | 72 | 73 | 74 | 75 | 76 | 77 | 78 |
| Compounding ingredients | First stage of kneading | Emulsion-polymerized SBR-2 *16 | 68.75 | 68.75 | 68.75 | 68.75 | 68.75 | 68.75 | 68.75 | 68.75 | 68.75 |
| | | Solution-polymerized SBR-1 *17 | 68.75 | 68.75 | 68.75 | 68.75 | 68.75 | 68.75 | 68.75 | 68.75 | 68.75 |
| | | Carbon black-1 N220 *2 | 10 | 10 | 10 | 10 | 10 | 10 | 10 | 10 | 10 |
| | | Silica *3 | 80 | 80 | 80 | 80 | 80 | 80 | 80 | 80 | 80 |
| | | Silane coupling agent Si75 *4 | — | 6.5 | — | — | — | 6.5 | — | — | — |
| | | Silane coupling agent NXT *18 | — | — | 6.5 | — | — | — | 6.5 | — | — |
| | | Silane coupling agent NXT-Z *19 | — | — | — | 6.5 | — | — | — | 6.5 | — |
| | | Silane coupling agent *20 | 6.5 | — | — | — | 6.5 | — | — | — | 6.5 |
| | | Aromatic oil | 5 | 5 | 5 | 5 | 5 | 5 | 5 | 5 | 5 |

TABLE 5-continued

| | | | | | | | | | | |
|---|---|---|---|---|---|---|---|---|---|---|
| | Stearic acid | 2 | 2 | 2 | 2 | 2 | 2 | 2 | 2 | 2 |
| | Antioxidant 6PPD *5 | 1 | 1 | 1 | 1 | 1 | 1 | 1 | 1 | 1 |
| | 1,3-Diphenyl-guanidine *6 | 1 | 1 | 1 | 1 | 1 | — | — | — | — |
| | 2-Mercaptobenzo-thiazole *7 | — | — | — | — | — | 0.7 | 0.7 | 0.7 | 0.7 |
| | Tetrakis(2-ethyl-hexyl)thiuram disulfide *10 | — | — | — | — | — | 0.8 | 0.8 | 0.8 | 0.8 |
| | Zinc dibenzyldithio-carbamate *12 | 1 | — | — | — | — | — | — | — | — |
| | Zinc isopropyl xanthate *13 | — | 1 | 1 | 1 | 1 | — | — | — | — |
| Last stage of kneading | Zinc flower | 3 | 3 | 3 | 3 | 3 | 3 | 3 | 3 | 3 |
| | 1,3-Diphenyl-guanidine *6 | 1 | 1 | 1 | 1 | 1 | 1 | 1 | 1 | 1 |
| | Vulcanization accelerator MBTS *8 | 0.8 | 0.8 | 0.8 | 0.8 | 0.8 | 0.8 | 0.8 | 0.8 | 0.8 |
| | Vulcanization accelerator TBBS *15 | 1.5 | 1.5 | 1.5 | 1.5 | 1.5 | 1.5 | 1.5 | 1.5 | 1.5 |
| | Sulfur | 1.5 | 1.5 | 1.5 | 1.5 | 1.5 | 1.5 | 1.5 | 1.5 | 1.5 |
| Maximum temperature of rubber composition in first stage of kneading (° C.) | | 150 | 150 | 150 | 150 | 150 | 150 | 150 | 150 | 150 |
| Property of vulcanized material: tan δ index | | 142 | 126 | 133 | 128 | 132 | 129 | 138 | 139 | 144 |

TABLE 6

| | | | Example | | | | | | | | | | |
|---|---|---|---|---|---|---|---|---|---|---|---|---|---|
| | | Mass parts | 79 | 80 | 81 | 82 | 83 | 84 | 85 | 86 | 87 | 88 | 89 |
| Compounding ingredients | First stage of kneading | Emulsion-polymerized SBR-2 *16 | 68.75 | 68.75 | 68.75 | 68.75 | 68.75 | 68.75 | 68.75 | 68.75 | 68.75 | 68.75 | 68.75 |
| | | Solution-polymerized SBR-1 *17 | 68.75 | 68.75 | 68.75 | 68.75 | 68.75 | 68.75 | 68.75 | 68.75 | 68.75 | 68.75 | 68.75 |
| | | Carbon black-1 N220 *2 | 10 | 10 | 10 | 10 | 10 | 10 | 10 | 10 | 10 | 10 | 10 |
| | | Silica *3 | 80 | 80 | 80 | 80 | 80 | 80 | 80 | 80 | 80 | 80 | 80 |
| | | Silane coupling agent Si75 *4 | 6.5 | — | — | 6.5 | — | — | — | — | 6.5 | — | — |
| | | Silane coupling agent NXT *18 | — | 6.5 | — | — | 6.5 | — | — | — | — | 6.5 | — |
| | | Silane coupling agent NXT-Z *19 | — | — | 6.5 | — | — | 6.5 | — | — | — | — | 6.5 |
| | | Silane coupling agent *20 | — | — | — | — | — | — | 6.5 | 6.5 | — | — | — |
| | | Aromatic oil | 5 | 5 | 5 | 5 | 5 | 5 | 5 | 5 | 5 | 5 | 5 |
| | | Stearic acid | 2 | 2 | 2 | 2 | 2 | 2 | 2 | 2 | 2 | 2 | 2 |
| | | Antioxidant 6PPD *5 | 1 | 1 | 1 | 1 | 1 | 1 | 1 | 1 | 1 | 1 | 1 |
| | | 1,3-Diphenyl-guanidine *6 | — | — | — | — | — | — | — | — | — | — | — |
| | | 2-Mercaptobenzo-thiazole *7 | 0.7 | 0.7 | 0.7 | 0.7 | 0.7 | 0.7 | 0.7 | 0.7 | — | — | — |
| | | Tetrakis(2-ethyl-hexyl)thiuram disulfide *10 | — | — | — | — | — | — | — | — | 1 | 1 | 1 |
| | | Zinc dibenzyldithio-carbamate *12 | 0.7 | 0.7 | 0.7 | 0.7 | — | — | — | — | 0.8 | 0.8 | 0.8 |
| | | Zinc isopropyl xanthate *13 | — | — | — | — | 0.5 | 0.5 | 0.5 | 0.5 | — | — | — |

TABLE 6-continued

|  |  |  |  |  |  |  |  |  |  |  |  |  |
|---|---|---|---|---|---|---|---|---|---|---|---|---|
| Last stage of kneading | Zinc flower | 3 | 3 | 3 | 3 | 3 | 3 | 3 | 3 | 3 | 3 | 3 |
|  | 1,3-Diphenylguanidine *6 | 1 | 1 | 1 | 1 | 1 | 1 | 1 | 1 | 1 | 1 | 1 |
|  | Vulcanization accelerator MBTS *8 | 0.8 | 0.8 | 0.8 | 0.8 | 0.8 | 0.8 | 0.8 | 0.8 | 0.8 | 0.8 | 0.8 |
|  | Vulcanization accelerator TBBS *15 | 1.5 | 1.5 | 1.5 | 1.5 | 1.5 | 1.5 | 1.5 | 1.5 | 1.5 | 1.5 | 1.5 |
|  | Sulfur | 1.5 | 1.5 | 1.5 | 1.5 | 1.5 | 1.5 | 1.5 | 1.5 | 1.5 | 1.5 | 1.5 |
| Maximum temperature of rubber composition in first stage of kneading (° C.) | | 150 | 150 | 150 | 150 | 150 | 150 | 150 | 150 | 150 | 150 | 150 |
| Property of vulcanized material: tan δ index | | 130 | 135 | 132 | 140 | 125 | 133 | 130 | 135 | 125 | 132 | 133 |

|  |  |  |  | Example | | | | | Comparative Example | | | |
|---|---|---|---|---|---|---|---|---|---|---|---|---|
|  |  | Mass parts |  | 90 | 91 | 92 | 93 | 94 | 10 | 11 | 12 | 13 |
| Compounding ingredients | First stage of kneading | Emulsion-polymerized SBR-2 *16 | | 68.75 | 68.75 | 68.75 | 68.75 | 68.75 | 68.75 | 68.75 | 68.75 | 68.75 |
| | | Solution-polymerized SBR-1 *17 | | 68.75 | 68.75 | 68.75 | 68.75 | 68.75 | 68.75 | 68.75 | 68.75 | 68.75 |
| | | Carbon black-1 N220 *2 | | 10 | 10 | 10 | 10 | 10 | 10 | 10 | 10 | 10 |
| | | Silica *3 | | 80 | 80 | 80 | 80 | 80 | 80 | 80 | 80 | 80 |
| | | Silane coupling agent Si75 *4 | | — | 6.5 | — | — | — | 6.5 | — | — | — |
| | | Silane coupling agent NXT *18 | | — | — | 6.5 | — | — | — | 6.5 | — | — |
| | | Silane coupling agent NXT-Z *19 | | — | — | — | 6.5 | — | — | — | 6.5 | — |
| | | Silane coupling agent *20 | | 6.5 | — | — | — | 6.5 | — | — | — | 6.5 |
| | | Aromatic oil | | 5 | 5 | 5 | 5 | 5 | 5 | 5 | 5 | 5 |
| | | Stearic acid | | 2 | 2 | 2 | 2 | 2 | 2 | 2 | 2 | 2 |
| | | Antioxidant 6PPD *5 | | 1 | 1 | 1 | 1 | 1 | 1 | 1 | 1 | 1 |
| | | 1,3-Diphenylguanidine *6 | | — | — | — | — | — | — | — | — | — |
| | | 2-Mercaptobenzothiazole *7 | | — | — | — | — | — | — | — | — | — |
| | | Tetrakis(2-ethylhexyl)thiuram disulfide *10 | | 1 | — | — | — | — | — | — | — | — |
| | | Zinc dibenzyldithiocarbamate *12 | | 0.8 | 0.8 | 0.8 | 0.8 | 0.8 | — | — | — | — |
| | | Zinc isopropyl xanthate *13 | | — | 0.5 | 0.5 | 0.5 | 0.5 | — | — | — | — |
| | Last stage of kneading | Zinc flower | | 3 | 3 | 3 | 3 | 3 | 3 | 3 | 3 | 3 |
| | | 1,3-Diphenylguanidine *6 | | 1 | 1 | 1 | 1 | 1 | 1 | 1 | 1 | 1 |
| | | Vulcanization accelerator MBTS *8 | | 0.8 | 0.8 | 0.8 | 0.8 | 0.8 | 0.8 | 0.8 | 0.8 | 0.8 |
| | | Vulcanization accelerator TBBS *15 | | 1.5 | 1.5 | 1.5 | 1.5 | 1.5 | 1.5 | 1.5 | 1.5 | 1.5 |
| | | Sulfur | | 1.5 | 1.5 | 1.5 | 1.5 | 1.5 | 1.5 | 1.5 | 1.5 | 1.5 |
| Maximum temperature of rubber composition in first stage of kneading (° C.) | | | | 150 | 150 | 150 | 150 | 150 | 150 | 150 | 150 | 150 |
| Property of vulcanized material: tan δ index | | | | 139 | 123 | 130 | 126 | 137 | 100 | 110 | 108 | 108 |

TABLE 7

| | | Mass parts | Example 95 | 96 | 97 | 98 | 99 | 100 | 101 | 102 | 103 | 104 | 105 | 106 | 107 | 108 | 109 |
|---|---|---|---|---|---|---|---|---|---|---|---|---|---|---|---|---|---|
| Compounding ingredients | First stage of kneading | Emulsion-polymerized SBR-1 *1 | 100 | 100 | 100 | 100 | 100 | 100 | 100 | 100 | 100 | 100 | 100 | 100 | 100 | 100 | 100 |
| | | Carbon black-1 N220 *2 | 10 | 10 | 10 | 10 | 10 | 10 | 10 | 10 | 10 | 10 | 10 | 10 | 10 | 10 | 10 |
| | | Silica *3 | 50 | 50 | 50 | 50 | 50 | 50 | 50 | 50 | 50 | 50 | 50 | 50 | 50 | 50 | 50 |
| | | Silane coupling agent Si75 *4 | 4 | 4 | 4 | 4 | 4 | 4 | 4 | 4 | 4 | 4 | 4 | 4 | 4 | 4 | 4 |
| | | Aromatic oil | 30 | 30 | 30 | 30 | 30 | 30 | 30 | 30 | 30 | 30 | 30 | 30 | 30 | 30 | 30 |
| | | Stearic acid | 2 | 2 | 2 | 2 | 2 | 2 | 2 | 2 | 2 | 2 | 2 | 2 | 2 | 2 | 2 |
| | | Antioxidant 6PPD *5 | 1 | 1 | 1 | 1 | 1 | 1 | 1 | 1 | 1 | 1 | 1 | 1 | 1 | 1 | 1 |
| | Second stage of kneading | 1,3-Diphenyl-guanidine *6 | 1 | 1 | 1 | 1 | 1 | 1 | 1 | — | — | — | — | — | — | — | — |
| | | 2-Mercaptobenzothiazole *7 | 0.6 | — | — | — | — | — | — | 0.6 | 0.6 | 0.6 | 0.6 | 0.6 | — | — | — |
| | | Di-2-benzothiazolyl disulfide *8 | — | 1 | — | — | — | — | — | — | — | — | — | — | 1 | 1 | 1 |
| | | N-cyclohexyl-2-benzothiazolyl-sulfenamide *9 | — | — | 1 | — | — | — | — | — | 1 | — | — | — | 1 | — | — |
| | | Tetrakis(2-ethylhexyl)thiuram disulfide *10 | — | — | — | 1 | — | — | — | — | — | 1 | — | — | — | 1 | — |
| | | N,N'-diethyl-thiourea *11 | — | — | — | — | 1 | — | — | — | — | — | 1 | — | — | — | 1 |
| | | Zinc dibenzyldithio-carbamate *12 | — | — | — | — | — | 1 | — | — | — | — | — | 1 | — | — | — |
| | | Zinc isopropyl xanthate *13 | — | — | — | — | — | — | 1 | — | — | — | — | — | 1 | — | — |
| | Last stage of kneading | Antioxidant TMDQ *14 | 1 | 1 | 1 | 1 | 1 | 1 | 1 | 1 | 1 | 1 | 1 | 1 | 1 | 1 | 1 |
| | | Zinc flower | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| | | 1,3-Diphenyl-guanidine *6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| | | Vulcanization accelerator MBTS *8 | 1 | 1 | 1 | 1 | 1 | 1 | 1 | 1 | 1 | 1 | 1 | 1 | 1 | 1 | 1 |
| | | Vulcanization accelerator TBBS *15 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Maximum temperature of rubber composition in second stage of kneading (° C.) | | | 150 | 150 | 150 | 150 | 150 | 150 | 150 | 150 | 150 | 150 | 150 | 150 | 150 | 150 | 150 |
| Property of vulcanized material: tan δ index | | | 135 | 128 | 127 | 135 | 126 | 140 | 136 | 129 | 140 | 128 | 143 | 140 | 124 | 131 | 120 |

| | | Mass parts | Example 110 | 111 | 112 | 113 | 114 | 115 | 116 | 117 | 118 | 119 | 120 | 121 | Comparative Example 1 |
|---|---|---|---|---|---|---|---|---|---|---|---|---|---|---|---|
| Compounding ingredients | First stage of kneading | Emulsion-polymerized SBR-1 *1 | 100 | 100 | 100 | 100 | 100 | 100 | 100 | 100 | 100 | 100 | 100 | 100 | 100 |
| | | Carbon black-1 N220 *2 | 10 | 10 | 10 | 10 | 10 | 10 | 10 | 10 | 10 | 10 | 10 | 10 | 10 |
| | | Silica *3 | 50 | 50 | 50 | 50 | 50 | 50 | 50 | 50 | 50 | 50 | 50 | 50 | 50 |
| | | Silane coupling agent Si75 *4 | 4 | 4 | 4 | 4 | 4 | 4 | 4 | 4 | 4 | 4 | 4 | 4 | 4 |
| | | Aromatic oil | 30 | 30 | 30 | 30 | 30 | 30 | 30 | 30 | 30 | 30 | 30 | 30 | 30 |
| | | Stearic acid | 2 | 2 | 2 | 2 | 2 | 2 | 2 | 2 | 2 | 2 | 2 | 2 | 2 |
| | | Antioxidant 6PPD *5 | 1 | 1 | 1 | 1 | 1 | 1 | 1 | 1 | 1 | 1 | 1 | 1 | 1 |
| | Second stage of kneading | 1,3-Diphenyl-guanidine *6 | — | — | — | — | — | — | — | — | — | — | — | — | — |
| | | 2-Mercaptobenzothiazole *7 | — | — | — | — | — | — | — | — | — | — | — | — | — |
| | | Di-2-benzothiazolyl disulfide *8 | 1 | 1 | — | — | — | — | — | — | — | — | — | — | — |

TABLE 7-continued

| | | | | | | | | | | | | | | |
|---|---|---|---|---|---|---|---|---|---|---|---|---|---|---|
| | N-cyclohexyl-2-benzothiazolylsulfenamide *9 | — | — | 1 | 1 | 1 | 1 | — | — | — | — | — | — | — |
| | Tetrakis(2-ethylhexyl)thiuram disulfide *10 | — | — | 1 | — | — | — | 1 | 1 | 1 | — | — | — | — |
| | N,N'-diethylthiourea *11 | — | — | — | 1 | — | — | 1 | — | — | 1 | 1 | — | — |
| | Zinc dibenzyldithiocarbamate *12 | 1 | — | — | — | 1 | — | — | 1 | — | 1 | — | 1 | — |
| | Zinc isopropyl xanthate *13 | — | 1 | — | — | — | 1 | — | — | 1 | — | 1 | 1 | — |
| Last stage of kneading | Antioxidant TMDQ *14 | 1 | 1 | 1 | 1 | 1 | 1 | 1 | 1 | 1 | 1 | 1 | 1 | 1 |
| | Zinc flower | 2.5 | 2.5 | 2.5 | 2.5 | 2.5 | 2.5 | 2.5 | 2.5 | 2.5 | 2.5 | 2.5 | 2.5 | 2.5 |
| | 1,3-Diphenylguanidine *6 | 0.6 | 0.6 | 0.6 | 0.6 | 0.6 | 0.6 | 0.6 | 0.6 | 0.6 | 0.6 | 0.6 | 0.6 | 0.6 |
| | Vulcanization accelerator MBTS *8 | 1 | 1 | 1 | 1 | 1 | 1 | 1 | 1 | 1 | 1 | 1 | 1 | 1 |
| | Vulcanization accelerator TBBS *15 | 0.6 | 0.6 | 0.6 | 0.6 | 0.6 | 0.6 | 0.6 | 0.6 | 0.6 | 0.6 | 0.6 | 0.6 | 0.6 |
| | Sulfur | 1.5 | 1.5 | 1.5 | 1.5 | 1.5 | 1.5 | 1.5 | 1.5 | 1.5 | 1.5 | 1.5 | 1.5 | 1.5 |
| Maximum temperature of rubber composition in second stage of kneading (° C.) | | 150 | 150 | 150 | 150 | 150 | 150 | 150 | 150 | 150 | 150 | 150 | 150 | — |
| Property of vulcanized material: tan δ index | | 135 | 134 | 129 | 121 | 134 | 127 | 135 | 144 | 136 | 123 | 124 | 148 | 100 |

TABLE 8

| | | Example | | | | | | | | | | | | | | |
|---|---|---|---|---|---|---|---|---|---|---|---|---|---|---|---|---|
| | Mass parts | 122 | 123 | 124 | 125 | 126 | 127 | 128 | 129 | 130 | 131 | 132 | 133 | 134 | 135 | 136 |
| Compounding ingredients — First stage of kneading | Emulsion-polymerized SBR-1 *1 | 100 | 100 | 100 | 100 | 100 | 100 | 100 | 100 | 100 | 100 | 100 | 100 | 100 | 100 | 100 |
| | Carbon black-1 N220 *2 | 10 | 10 | 10 | 10 | 10 | 10 | 10 | 10 | 10 | 10 | 10 | 10 | 10 | 10 | 10 |
| | Silica *3 | 50 | 50 | 50 | 50 | 50 | 50 | 50 | 50 | 50 | 50 | 50 | 50 | 50 | 50 | 50 |
| | Silane coupling agent Si75 *4 | 4 | 4 | 4 | 4 | 4 | 4 | 4 | 4 | 4 | 4 | 4 | 4 | 4 | 4 | 4 |
| | Aromatic oil | 30 | 30 | 30 | 30 | 30 | 30 | 30 | 30 | 30 | 30 | 30 | 30 | 30 | 30 | 30 |
| | Stearic acid | 2 | 2 | 2 | 2 | 2 | 2 | 2 | 2 | 2 | 2 | 2 | 2 | 2 | 2 | 2 |
| | Antioxidant 6PPD *5 | 1 | 1 | 1 | 1 | 1 | 1 | 1 | 1 | 1 | 1 | 1 | 1 | 1 | 1 | 1 |
| Delayed addition during first stage of kneading | 1,3-Diphenylguanidine *6 | 1 | 1 | 1 | 1 | 1 | 1 | 1 | — | — | — | — | — | — | — | — |
| | 2-Mercaptobenzothiazole *7 | 0.6 | — | — | — | — | — | — | — | 0.6 | 0.6 | 0.6 | 0.6 | 0.6 | — | — |
| | Di-2-benzothiazolyl disulfide *8 | — | 1 | — | — | — | — | — | — | — | — | — | — | 1 | 1 | 1 |
| | N-cyclohexyl-2-benzothiazolylsulfenamide *9 | — | — | 1 | — | — | — | — | 1 | — | — | — | — | 1 | — | — |
| | Tetrakis(2-ethylhexyl)thiuram disulfide *10 | — | — | — | 1 | — | — | — | 1 | — | — | — | — | — | 1 | — |
| | N,N'-diethylthiourea *11 | — | — | — | — | 1 | — | — | — | 1 | — | — | 1 | — | — | 1 |
| | Zinc dibenzyldithiocarbamate *12 | — | — | — | — | — | 1 | — | — | — | — | 1 | — | — | — | — |
| | Zinc isopropyl xanthate *13 | — | — | — | — | — | — | 1 | — | — | 1 | — | — | — | — | — |

TABLE 8-continued

| | | | | | | | | | | | | | | | | | |
|---|---|---|---|---|---|---|---|---|---|---|---|---|---|---|---|---|---|
| Last stage of kneading | Antioxidant TMDQ *14 | 1 | 1 | 1 | 1 | 1 | 1 | 1 | 1 | 1 | 1 | 1 | 1 | 1 | 1 | 1 |
| | Zinc flower | 2.5 | 2.5 | 2.5 | 2.5 | 2.5 | 2.5 | 2.5 | 2.5 | 9.5 | 2.5 | 9.5 | 2.5 | 2.5 | 2.5 | 2.5 |
| | 1,3-Diphenyl-guanidine *6 | 06 | 06 | 06 | 06 | 0.6 | 0.6 | 0.6 | 0.6 | 0.6 | 0.6 | 0.6 | 0.6 | 0.6 | 0.6 | 0.6 |
| | Vulcanization accelerator MBTS *8 | 1 | 1 | 1 | 1 | 1 | 1 | 1 | 1 | 1 | 1 | 1 | 1 | 1 | 1 | 1 |
| | Vulcanization accelerator TBBS *15 | 06 | 06 | 06 | 06 | 0.6 | 0.6 | 0.6 | 0.6 | 0.6 | 0.6 | 0.6 | 0.6 | 0.6 | 0.6 | 0.6 |
| | Sulfur | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Time elapsed from addition of silica and silane coupling agent to delayed addition of accelerator (sec) | | 90 | 90 | 90 | 90 | 90 | 90 | 90 | 90 | 90 | 90 | 90 | 90 | 90 | 90 | 90 |
| Temperature of rubber composition when delayed addition of accelerator was made (° C.) | | 130 | 130 | 130 | 130 | 130 | 130 | 130 | 130 | 130 | 130 | 130 | 130 | 130 | 130 | 130 |
| Maximum temperature of rubber composition in first stage of kneading (° C.) | | 150 | 150 | 150 | 150 | 150 | 150 | 150 | 150 | 150 | 150 | 150 | 150 | 150 | 150 | 150 |
| Property of vulcanized material: tan δ index | | 138 | 126 | 125 | 137 | 124 | 138 | 138 | 133 | 139 | 126 | 140 | 143 | 123 | 134 | 121 |

| | | | Example | | | | | | | | | | | | Comparative |
|---|---|---|---|---|---|---|---|---|---|---|---|---|---|---|---|
| | | Mass parts | 137 | 138 | 139 | 140 | 141 | 142 | 143 | 144 | 145 | 146 | 147 | 148 | Example 1 |
| Compounding ingredients | First stage of kneading | Emulsion-polymerized SBR-1 *1 | 100 | 100 | 100 | 100 | 100 | 100 | 100 | 100 | 100 | 100 | 100 | 100 | 100 |
| | | Carbon black-1 N220 *2 | 10 | 10 | 10 | 10 | 10 | 10 | 10 | 10 | 10 | 10 | 10 | 10 | 10 |
| | | Silica *3 | 50 | 50 | 50 | 50 | 50 | 50 | 50 | 50 | 50 | 50 | 50 | 50 | 50 |
| | | Silane coupling agent Si75 *4 | 4 | 4 | 4 | 4 | 4 | 4 | 4 | 4 | 4 | 4 | 4 | 4 | 4 |
| | | Aromatic oil | 30 | 30 | 30 | 30 | 30 | 30 | 30 | 30 | 30 | 30 | 30 | 30 | 30 |
| | | Stearic acid | 2 | 2 | 2 | 2 | 2 | 2 | 2 | 2 | 2 | 2 | 2 | 2 | 2 |
| | | Antioxidant 6PPD *5 | 1 | 1 | 1 | 1 | 1 | 1 | 1 | 1 | 1 | 1 | 1 | 1 | 1 |
| | Delayed addition during first stage of kneading | 1,3-Diphenyl-guanidine *6 | — | — | — | — | — | — | — | — | — | — | — | — | — |
| | | 2-Mercaptobenzo-thiazole *7 | — | — | — | — | — | — | — | — | — | — | — | — | — |
| | | Di-2-benzothiazolyl disulfide *8 | 1 | 1 | — | — | — | — | — | — | — | — | — | — | — |
| | | N-cyclohexyl-2-benzothiazolyl-sulfenamide *9 | — | — | 1 | 1 | 1 | 1 | — | — | — | — | — | — | — |
| | | Tetrakis(2-ethyl-hexyl)thiuram disulfide *10 | — | — | — | 1 | — | — | 1 | 1 | 1 | — | — | — | — |
| | | N,N'-diethyl-thiourea *11 | — | — | — | — | 1 | — | 1 | — | — | 1 | 1 | — | — |
| | | Zinc dibenzyldithio-carbamate *12 | 1 | — | — | — | 1 | — | 1 | — | 1 | — | 1 | — | — |
| | | Zinc isopropyl xanthate *13 | — | 1 | — | — | 1 | — | 1 | — | 1 | 1 | — | — | — |
| | Last stage of kneading | Antioxidant TMDQ *14 | 1 | 1 | 1 | 1 | 1 | 1 | 1 | 1 | 1 | 1 | 1 | 1 | 1 |
| | | Zinc flower | 2.5 | 2.5 | 2.5 | 2.5 | 2.5 | 9.5 | 2.5 | 9.5 | 2.5 | 2.5 | 2.5 | 2.5 | 2.5 |
| | | 1,3-Diphenyl-guanidine *6 | 0.6 | 0.6 | 0.6 | 0.6 | 0.6 | 0.6 | 0.6 | 0.6 | 0.6 | 0.6 | 0.6 | 0.6 | 0.6 |
| | | Vulcanization accelerator MBTS *8 | 1 | 1 | 1 | 1 | 1 | 1 | 1 | 1 | 1 | 1 | 1 | 1 | 1 |
| | | Vulcanization accelerator TBBS *15 | 0.6 | 0.6 | 0.6 | 0.6 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 | 1.5 | 1.5 | 1.5 | 1.5 |

TABLE 8-continued

|  | | | | | | | | | | | | | |
|---|---|---|---|---|---|---|---|---|---|---|---|---|---|
| Time elapsed from addition of silica and silane coupling agent to delayed addition of accelerator (sec) | 90 | 90 | 90 | 90 | 90 | 90 | 90 | 90 | 90 | 90 | 90 | 90 | — |
| Temperature of rubber composition when delayed addition of accelerator was made (° C.) | 130 | 130 | 130 | 130 | 130 | 130 | 130 | 130 | 130 | 130 | 130 | 130 | — |
| Maximum temperature of rubber composition in first stage of kneading (° C.) | 150 | 150 | 150 | 150 | 150 | 150 | 150 | 150 | 150 | 150 | 150 | 150 | 150 |
| Property of vulcanized material: tan δ index | 128 | 135 | 128 | 120 | 134 | 125 | 137 | 148 | 139 | 120 | 122 | 150 | 100 |

TABLE 9

| | | | Example | | | | | | | | |
|---|---|---|---|---|---|---|---|---|---|---|---|
| | | Mass parts | 122 | 149 | 150 | 151 | 152 | 153 | 154 | 155 | 132 |
| Compounding ingredients | First stage of kneading | Emulsion-polymerized SBR-1 *1 | 100 | 100 | 100 | 100 | 100 | 100 | 100 | 100 | 100 |
| | | Carbon black-1 N220 *2 | 10 | 10 | 10 | 10 | 10 | 10 | 10 | 10 | 10 |
| | | Silica *3 | 50 | 50 | 50 | 50 | 50 | 50 | 50 | 50 | 50 |
| | | Silane coupling agent Si75 *4 | 4 | 4 | 4 | 4 | 4 | 4 | 4 | 4 | 4 |
| | | Aromatic oil | 30 | 30 | 30 | 30 | 30 | 30 | 30 | 30 | 30 |
| | | Stearic acid | 2 | 2 | 2 | 2 | 2 | 2 | 2 | 2 | 2 |
| | | Antioxidant 6PPD *5 | 1 | 1 | 1 | 1 | 1 | 1 | 1 | 1 | 1 |
| | Delayed addition during first stage of kneading | 1,3-Diphenyl-guanidine *6 | 1 | 1 | 1 | 1 | 1 | 1 | 1 | 1 | — |
| | | 2-Mercaptobenzo-thiazole *7 | 0.6 | 0.6 | 0.6 | 0.6 | 0.6 | 0.6 | 0.6 | 0.6 | 0.6 |
| | | Di-2-benzothiazolyl disulfide *8 | — | — | — | — | — | — | — | — | — |
| | | N-cyclohexyl-2-benzo-thiazolyl-sulfenamide *9 | — | — | — | — | — | — | — | — | — |
| | | Tetrakis(2-ethylhexyl) thiuram disulfide *10 | — | — | — | — | — | — | — | — | — |
| | | N,N'-diethylthiourea *11 | — | — | — | — | — | — | — | — | — |
| | | Zinc dibenzyldithiocarbamate *12 | — | — | — | — | — | — | — | — | 1 |
| | | Zinc isopropyl xanthate *13 | — | — | — | — | — | — | — | — | — |
| | Last stage of kneading | Antioxidant TMDQ *14 | 1 | 1 | 1 | 1 | 1 | 1 | 1 | 1 | 1 |
| | | Zinc flower | 2.5 | 2.5 | 2.5 | 2.5 | 2.5 | 2.5 | 2.5 | 2.5 | 2.5 |
| | | 1,3-Diphenyl-guanidine *6 | 0.6 | 0.6 | 0.6 | 0.6 | 0.6 | 0.6 | 0.6 | 0.6 | 0.6 |
| | | Vulcanization accelerator MBTS *8 | 1 | 1 | 1 | 1 | 1 | 1 | 1 | 1 | 1 |
| | | Vulcanization accelerator TBBS *15 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 |
| Time elapsed from addition of silica and silane coupling agent to delayed addition of accelerator (sec) | | | 90 | 15 | 30 | 60 | 120 | 150 | 180 | 210 | 90 |
| Temperature of rubber composition when delayed addition of accelerator was made (° C.) | | | 130 | 80 | 100 | 120 | 135 | 140 | 145 | 150 | 130 |
| Maximum temperature of rubber composition in first stage of kneading (° C.) | | | 150 | 150 | 150 | 150 | 150 | 150 | 155 | 155 | 150 |
| Property of vulcanized material: tan δ index | | | 138 | 130 | 134 | 137 | 138 | 137 | 136 | 135 | 140 |

| | | | Example | | | | | | | Comparative Example 1 |
|---|---|---|---|---|---|---|---|---|---|---|
| | | Mass parts | 156 | 157 | 158 | 159 | 160 | 161 | 162 | |
| Compounding ingredients | First stage of kneading | Emulsion-polymerized SBR-1 *1 | 100 | 100 | 100 | 100 | 100 | 100 | 100 | 100 |
| | | Carbon black-1 N220 *2 | 10 | 10 | 10 | 10 | 10 | 10 | 10 | 10 |
| | | Silica *3 | 50 | 50 | 50 | 50 | 50 | 50 | 50 | 50 |
| | | Silane coupling agent Si75 *4 | 4 | 4 | 4 | 4 | 4 | 4 | 4 | 4 |
| | | Aromatic oil | 30 | 30 | 30 | 30 | 30 | 30 | 30 | 30 |
| | | Stearic acid | 2 | 2 | 2 | 2 | 2 | 2 | 2 | 2 |
| | | Antioxidant 6PPD *5 | 1 | 1 | 1 | 1 | 1 | 1 | 1 | 1 |

TABLE 9-continued

| | | | | | | | | | |
|---|---|---|---|---|---|---|---|---|---|
| Delayed addition during first stage of kneading | 1,3-Diphenyl-guanidine *6 | — | — | — | — | — | — | — | — |
| | 2-Mercaptobenzo-thiazole *7 | 0.6 | 0.6 | 0.6 | 0.6 | 0.6 | 0.6 | 0.6 | — |
| | Di-2-benzothiazolyl disulfide *8 | — | — | — | — | — | — | — | — |
| | N-cyclohexyl-2-benzo-thiazolyl-sulfenamide *9 | — | — | — | — | — | — | — | — |
| | Tetrakis(2-ethylhex-yl) thiuram disulfide *10 | — | — | — | — | — | — | — | — |
| | N,N'-diethylthiourea *11 | — | — | — | — | — | — | — | — |
| | Zinc dibenzyldithiocarba-mate *12 | 1 | 1 | 1 | 1 | 1 | 1 | 1 | — |
| | Zinc isopropyl xanthate *13 | — | — | — | — | — | — | — | — |
| Last stage of kneading | Antioxidant TMDQ *14 | 1 | 1 | 1 | 1 | 1 | 1 | 1 | 1 |
| | Zinc flower | 2.5 | 2.5 | 2.5 | 2.5 | 2.5 | 2.5 | 2.5 | 2.5 |
| | 1,3-Diphenyl-guanidine *6 | 0.6 | 0.6 | 0.6 | 0.6 | 0.6 | 0.6 | 0.6 | 0.6 |
| | Vulcanization accelerator MBTS *8 | 1 | 1 | 1 | 1 | 1 | 1 | 1 | 1 |
| | Vulcanization accelerator TBBS *15 | 0.6 | 0.6 | 0.6 | 0.6 | 0.6 | 0.6 | 0.6 | 0.6 |
| | Sulfur | 1.5 | 1.5 | 1.5 | 1.5 | 1.5 | 1.5 | 1.5 | 1.5 |
| Time elapsed from addition of silica and silane coupling agent to delayed addition of accelerator (sec) | | 15 | 30 | 60 | 120 | 150 | 180 | 210 | — |
| Temperature of rubber composition when delayed addition of accelerator was made (° C.) | | 80 | 100 | 120 | 135 | 140 | 145 | 150 | — |
| Maximum temperature of rubber composition in first stage of kneading (° C.) | | 150 | 150 | 150 | 150 | 150 | 155 | 155 | 150 |
| Property of vulcanized material: tan δ index | | 134 | 137 | 140 | 140 | 139 | 137 | 137 | 100 |

TABLE 10

| | | | Example | | | | | | | | | | | | | | |
|---|---|---|---|---|---|---|---|---|---|---|---|---|---|---|---|---|---|
| | | Mass parts | 163 | 164 | 165 | 166 | 167 | 168 | 169 | 170 | 171 | 172 | 173 | 174 | 175 | 176 | 177 |
| Compounding ingredients | First stage of kneading | Solution-polymerized SBR-2 *21 | 100 | 100 | 100 | 100 | 100 | 100 | 100 | 100 | 100 | 100 | 100 | 100 | 100 | 100 | 100 |
| | | Carbon black-1 N220 *2 | 10 | 10 | 10 | 10 | 10 | 10 | 10 | 10 | 10 | 10 | 10 | 10 | 10 | 10 | 10 |
| | | Silica *3 | 50 | 50 | 50 | 50 | 50 | 50 | 50 | 50 | 50 | 50 | 50 | 50 | 50 | 50 | 50 |
| | | Silane coupling agent Si75 *4 | 4 | 4 | 4 | 4 | 4 | 4 | 4 | 4 | 4 | 4 | 4 | 4 | 4 | 4 | 4 |
| | | Aromatic oil | 30 | 30 | 30 | 30 | 30 | 30 | 30 | 30 | 30 | 30 | 30 | 30 | 30 | 30 | 30 |
| | | Stearic acid | — | — | — | — | — | — | — | — | — | — | — | — | — | — | — |
| | | Antioxidant 6PPD *5 | 1 | 1 | 1 | 1 | 1 | 1 | 1 | 1 | 1 | 1 | 1 | 1 | 1 | 1 | 1 |
| | | 1,3-Diphenyl-guanidine *6 | 1 | 1 | 1 | 1 | 1 | 1 | 1 | — | — | — | — | — | — | — | — |
| | | 2-Mercaptobenzo-thiazole *7 | 0.6 | — | — | — | — | — | — | 0.6 | 0.6 | 0.6 | 0.6 | 0.6 | — | — | — |
| | | Di-2-benzothiazolyl disulfide *8 | — | 1 | — | — | — | — | — | — | — | — | — | — | 1 | 1 | 1 |
| | | N-cyclohexyl-2-benzothiazolyl-sulfenamide *9 | — | — | 1 | — | — | — | — | — | 1 | — | — | — | 1 | — | — |
| | | Tetrakis(2-ethyl-hexyl)thiuram disulfide *10 | — | — | — | 1 | — | — | — | — | — | 1 | — | — | — | 1 | — |
| | | N,N'-diethyl-thiourea *11 | — | — | — | — | 1 | — | — | — | — | — | 1 | — | — | — | 1 |
| | | Zinc dibenzyldithio-carbamate *12 | — | — | — | — | — | 1 | — | — | — | — | — | 1 | — | — | — |
| | | Zinc isopropyl xanthate *13 | — | — | — | — | — | — | 1 | — | — | — | — | 1 | — | — | — |

TABLE 10-continued

| | | Mass parts | | | | | | | | | | | | | | | |
|---|---|---|---|---|---|---|---|---|---|---|---|---|---|---|---|---|---|
| | Last stage of kneading | Stearic acid | 2 | 2 | 2 | 2 | 2 | 2 | 2 | 2 | 2 | 2 | 2 | 2 | 2 | 2 | 2 |
| | | Antioxidant TMDQ *14 | 1 | 1 | 1 | 1 | 1 | 1 | 1 | 1 | 1 | 1 | 1 | 1 | 1 | 1 | 1 |
| | | Zinc flower | 2.5 | 2.5 | 2.5 | 1.5 | 2.5 | 2.5 | 1.5 | 2.5 | 2.5 | 1.5 | 2.5 | 1.5 | 2.5 | 2.5 | 1.5 |
| | | 1,3-Diphenyl-guanidine *6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| | | Vulcanization accelerator MBTS *8 | 1 | 1 | 1 | 1 | 1 | 1 | 1 | 1 | 1 | 1 | 1 | 1 | 1 | 1 | 1 |
| | | Vulcanization accelerator TBBS *15 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Maximum temperature of rubber composition in first stage of kneading (° C.) | | | 150 | 150 | 150 | 150 | 150 | 150 | 150 | 150 | 150 | 150 | 150 | 150 | 150 | 150 | 150 |
| Property of vulcanized material: tan δ index | | | 140 | 134 | 130 | 133 | 125 | 138 | 139 | 130 | 141 | 130 | 142 | 136 | 125 | 132 | 124 |

| | | | Example | | | | | | | | | | | | Comparative Example | |
|---|---|---|---|---|---|---|---|---|---|---|---|---|---|---|---|---|
| | | Mass parts | 178 | 179 | 180 | 181 | 182 | 183 | 184 | 185 | 186 | 187 | 188 | 189 | 14 | 15 |
| Compounding ingredients | First stage of kneading | Solution-polymerized SBR-2 *21 | 100 | 100 | 100 | 100 | 100 | 100 | 100 | 100 | 100 | 100 | 100 | 100 | 100 | 100 |
| | | Carbon black-1 N220 *2 | 10 | 10 | 10 | 10 | 10 | 10 | 10 | 10 | 10 | 10 | 10 | 10 | 10 | 10 |
| | | Silica *3 | 50 | 50 | 50 | 50 | 50 | 50 | 50 | 50 | 50 | 50 | 50 | 50 | 50 | 50 |
| | | Silane coupling agent Si75 *4 | 4 | 4 | 4 | 4 | 4 | 4 | 4 | 4 | 4 | 4 | 4 | 4 | 4 | 4 |
| | | Aromatic oil | 30 | 30 | 30 | 30 | 30 | 30 | 30 | 30 | 30 | 30 | 30 | 30 | 30 | 30 |
| | | Stearic acid | — | — | — | — | — | — | — | — | — | — | — | — | 2 | — |
| | | Antioxidant 6PPD *5 | 1 | 1 | 1 | 1 | 1 | 1 | 1 | 1 | 1 | 1 | 1 | 1 | 1 | 1 |
| | | 1,3-Diphenyl-guanidine *6 | — | — | — | — | — | — | — | — | — | — | — | — | — | — |
| | | 2-Mercaptobenzothiazole *7 | — | — | — | — | — | — | — | — | — | — | — | — | — | — |
| | | Di-2-benzothiazolyl disulfide *8 | 1 | 1 | — | — | — | — | — | — | — | — | — | — | — | — |
| | | N-cyclohexyl-2-benzothiazolylsulfenamide *9 | — | — | 1 | 1 | 1 | 1 | — | — | — | — | — | — | — | — |
| | | Tetrakis(2-ethylhexyl)thiuram disulfide *10 | — | — | 1 | — | — | — | 1 | 1 | 1 | — | — | — | — | — |
| | | N,N'-diethylthiourea *11 | — | — | — | 1 | — | — | 1 | — | — | 1 | 1 | — | — | — |
| | | Zinc dibenzyldithiocarbamate *12 | 1 | — | — | — | 1 | — | — | 1 | — | 1 | — | 1 | — | — |
| | | Zinc isopropyl xanthate *13 | — | 1 | — | — | — | 1 | — | — | 1 | — | 1 | 1 | — | — |
| | Last stage of kneading | Stearic acid | 2 | 2 | 2 | 2 | 2 | 2 | 2 | 2 | 2 | 2 | 2 | 2 | — | 2 |
| | | Antioxidant TMDQ *14 | 1 | 1 | 1 | 1 | 1 | 1 | 1 | 1 | 1 | 1 | 1 | 1 | 1 | 1 |
| | | Zinc flower | 2.5 | 1.5 | 2.5 | 2.5 | 1.5 | 2.5 | 1.5 | 2.5 | 2.5 | 1.5 | 2.5 | 2.5 | 2.5 | 2.5 |
| | | 1,3-Diphenyl-guanidine *6 | 0.6 | 0.6 | 0.6 | 0.6 | 0.6 | 0.6 | 0.6 | 0.6 | 0.6 | 0.6 | 0.6 | 0.6 | 0.6 | 0.6 |
| | | Vulcanization accelerator MBTS *8 | 1 | 1 | 1 | 1 | 1 | 1 | 1 | 1 | 1 | 1 | 1 | 1 | 1 | 1 |
| | | Vulcanization accelerator TBBS *15 | 0.6 | 0.6 | 0.6 | 0.6 | 0.6 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 | 1.5 | 1.5 | 1.5 | 1.5 | 1.5 |
| Maximum temperature of rubber composition in first stage of kneading (° C.) | | | 150 | 150 | 150 | 150 | 150 | 150 | 150 | 150 | 150 | 150 | 150 | 150 | 150 | 150 |
| Property of vulcanized material: tan δ index | | | 130 | 130 | 131 | 124 | 132 | 130 | 135 | 142 | 143 | 124 | 125 | 145 | 100 | 115 |

TABLE 11

| | | Mass parts | Example |||||||||
|---|---|---|---|---|---|---|---|---|---|---|---|
| | | | 1 | 190 | 191 | 192 | 193 | 11 | 194 | 195 | 196 |
| Compounding ingredients | First stage of kneading | Emulsion-polymerized SBR-1 *1 | 100 | 100 | 100 | 100 | 100 | 100 | 100 | 100 | 100 |
| | | Carbon black-1 N220 *2 | 10 | 20 | 30 | 40 | 50 | 10 | 20 | 30 | 40 |
| | | Silica *3 | 50 | 40 | 30 | 20 | 10 | 50 | 40 | 30 | 20 |
| | | Silane coupling agent Si75 *4 | 4 | 4 | 4 | 4 | 4 | 4 | 4 | 4 | 4 |
| | | Aromatic oil | 30 | 30 | 30 | 30 | 30 | 30 | 30 | 30 | 30 |
| | | Stearic acid | 2 | 2 | 2 | 2 | 2 | 2 | 2 | 2 | 2 |
| | | Antioxidant 6PPD *5 | 1 | 1 | 1 | 1 | 1 | 1 | 1 | 1 | 1 |
| | | 1,3-Diphenyl-guanidine *6 | 1 | 1 | 1 | 1 | 1 | — | — | — | — |
| | | 2-Mercaptobenzothiazole *7 | 0.6 | 0.6 | 0.6 | 0.6 | 0.6 | 0.6 | 0.6 | 0.6 | 0.6 |
| | | Di-2-benzothiazolyl disulfide *8 | — | — | — | — | — | — | — | — | — |
| | | N-cyclohexyl-2-benzothiazolyl-sulfenamide *9 | — | — | — | — | — | — | — | — | — |
| | | Tetrakis(2-ethylhexyl)thiuram disulfide *10 | — | — | — | — | — | — | — | — | — |
| | | N,N'-diethylthiourea *11 | — | — | — | — | — | — | — | — | — |
| | | Zinc dibenzyldithiocarbamate *12 | — | — | — | — | — | 1 | 1 | 1 | 1 |
| | | Zinc isopropyl xanthate *13 | — | — | — | — | — | — | — | — | — |
| | Last stage of kneading | Antioxidant TMDQ *14 | 1 | 1 | 1 | 1 | 1 | 1 | 1 | 1 | 1 |
| | | Zinc flower | 2.5 | 2.5 | 2.5 | 2.5 | 2.5 | 2.5 | 2.5 | 2.5 | 2.5 |
| | | 1,3-Diphenyl-guanidine *6 | 0.6 | 0.6 | 0.6 | 0.6 | 0.6 | 0.6 | 0.6 | 0.6 | 0.6 |
| | | Vulcanization accelerator MBTS *8 | 1 | 1 | 1 | 1 | 1 | 1 | 1 | 1 | 1 |
| | | Vulcanization accelerator TBBS *15 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 |
| Proportion of silica in filler (%) | | | 83 | 67 | 50 | 33 | 17 | 83 | 67 | 50 | 33 |
| Maximum temperature of rubber composition in first stage of kneading (° C.) | | | 150 | 150 | 150 | 150 | 150 | 150 | 150 | 150 | 150 |
| Property of vulcanized material: tan δ index | | | 132 | 126 | 120 | 114 | 108 | 135 | 129 | 121 | 114 |

| | | Mass parts | Example ||||||| Comparative Example 1 |
|---|---|---|---|---|---|---|---|---|---|
| | | | 197 | 21 | 198 | 199 | 200 | 201 | |
| Compounding ingredients | First stage of kneading | Emulsion-polymerized SBR-1 *1 | 100 | 100 | 100 | 100 | 100 | 100 | 100 |
| | | Carbon black-1 N220 *2 | 50 | 10 | 20 | 30 | 40 | 50 | 10 |
| | | Silica *3 | 10 | 50 | 40 | 30 | 20 | 10 | 50 |
| | | Silane coupling agent Si75 *4 | 4 | 4 | 4 | 4 | 4 | 4 | 4 |
| | | Aromatic oil | 30 | 30 | 30 | 30 | 30 | 30 | 30 |
| | | Stearic acid | 2 | 2 | 2 | 2 | 2 | 2 | 2 |
| | | Antioxidant 6PPD *5 | 1 | 1 | 1 | 1 | 1 | 1 | 1 |
| | | 1,3-Diphenyl-guanidine *6 | — | — | — | — | — | — | — |
| | | 2-Mercaptobenzothiazole *7 | 0.6 | — | — | — | — | — | — |
| | | Di-2-benzothiazolyl disulfide *8 | — | — | — | — | — | — | — |
| | | N-cyclohexyl-2-benzothiazolyl-sulfenamide *9 | — | 1 | 1 | 1 | 1 | 1 | — |
| | | Tetrakis(2-ethylhexyl)thiuram disulfide *10 | — | — | — | — | — | — | — |
| | | N,N'-diethylthiourea *11 | — | — | — | — | — | — | — |
| | | Zinc dibenzyldithiocarbamate *12 | 1 | — | — | — | — | — | — |
| | | Zinc isopropyl xanthate *13 | — | 1 | 1 | 1 | 1 | 1 | — |
| | Last stage of kneading | Antioxidant TMDQ *14 | 1 | 1 | 1 | 1 | 1 | 1 | 1 |
| | | Zinc flower | 2.5 | 2.5 | 2.5 | 2.5 | 2.5 | 2.5 | 2.5 |
| | | 1,3-Diphenyl-guanidine *6 | 0.6 | 0.6 | 0.6 | 0.6 | 0.6 | 0.6 | 0.6 |
| | | Vulcanization accelerator MBTS *8 | 1 | 1 | 1 | 1 | 1 | 1 | 1 |
| | | Vulcanization accelerator TBBS *15 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 |

TABLE 11-continued

| | | | | | | | |
|---|---|---|---|---|---|---|---|
| Proportion of silica in filler (%) | 17 | 83 | 67 | 50 | 33 | 17 | 83 |
| Maximum temperature of rubber composition in first stage of kneading (° C.) | 150 | 150 | 150 | 150 | 150 | 150 | 150 |
| Property of vulcanized material: tan δ index | 106 | 127 | 122 | 116 | 110 | 106 | 100 |

TABLE 12

| | | | | | | | | Comparative Example | |
|---|---|---|---|---|---|---|---|---|---|
| | | | | | Example | | | | |
| | | Mass parts | 95 | 202 | 203 | 204 | 205 | 1 | 16 |
| Compounding ingredients | First stage of kneading | Emulsion-polymerized SBR-1 *1 | 100 | 100 | 100 | 100 | 100 | 100 | 100 |
| | | Carbon black-1 N220 *2 | 10 | 10 | 10 | 10 | 10 | 10 | 10 |
| | | Silica *3 | 50 | 50 | 50 | 50 | 50 | 50 | 50 |
| | | Silane coupling agent Si75 *4 | 4 | 4 | 4 | 4 | 4 | 4 | 4 |
| | | Aromatic oil | 30 | 30 | 30 | 30 | 30 | 30 | 30 |
| | | Stearic acid | 2 | 2 | 2 | 2 | 2 | 2 | 2 |
| | | Antioxidant 6PPD *5 | 1 | 1 | 1 | 1 | 1 | 1 | 1 |
| | Second stage of kneading | 1,3-Diphenylguanidine *6 | 1 | 1 | 1 | 1 | 1 | — | — |
| | | 2-Mercaptobenzothiazole *7 | 0.6 | 0.6 | 0.6 | 0.6 | 0.6 | — | — |
| | Last stage of kneading | Antioxidant TMDQ *14 | 1 | 1 | 1 | 1 | 1 | 1 | 1 |
| | | Zinc flower | 2.5 | 2.5 | 2.5 | 2.5 | 2.5 | 2.5 | 2.5 |
| | | 1,3-Diphenylguanidine *6 | 0.6 | 0.6 | 0.6 | 0.6 | 0.6 | 0.6 | 0.6 |
| | | Vulcanization accelerator MBTS *8 | 1 | 1 | 1 | 1 | 1 | 1 | 1 |
| | | Vulcanization accelerator TBBS *15 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 |
| Maximum temperature of rubber composition in second stage of kneading (° C.) | | | 150 | 185 | 155 | 140 | 125 | — | 170 |
| Property of vulcanized material: tan δ index | | | 135 | 148 | 140 | 129 | 121 | 100 | 105 |

NOTES TO TABLES 1 TO 8

In Tables 1 to 8, the first stage (X) of kneading, the second stage (Y) of kneading, and the last stage (Z) of kneading are abbreviated as "first stage of kneading," "second stage of kneading," and "last stage of kneading," respectively.

*1: JSR's emulsion-polymerized styrene-butadiene copolymer rubber (SBR), trade name "#1500"
*2: Trade name "#80" produced by Asahi Carbon Co., Ltd.
*3: Tosoh Silica's trade name "Nipsil AQ", BET specific surface area 220 m²/g
*4: Bis(3-triethoxysilylpropyl)disulfide (mean sulfur chain length: 2.35), Evonik's silane coupling agent, trade name "Si75" (registered trademark)
*5: N-(1,3-dimethylbutyl)-N'-phenyl-p-phenylenediamine, by Ouchi Shinko Chemical, trade name "Nocrac 6C"
*6: 1,3-Diphenylguanidine, Sanshin Chemical's trade name "Sanceler D"
*7: 2-Mercaptobenzothiazole; trade name "Nocceler M-P" produced by Ouchi Shinko Chemical Co., Ltd.
*8: Di-2-benzothiazolyl disulfide, Sanshin Chemical's trade name "Sanceler DM"
*9: N-Cyclohexyl-2-benzothiazolylsulfenamide; trade name "Nocceler CZ" produced by Ouchi Shinko Chemical Industrial Co., Ltd.
*10: Tetrakis(2-ethylhexyl)thiuram disulfide; trade name "Nocceler TOT-N" produced by Ouchi Shinko Chemical Industrial Co., Ltd.
*11: N,N'-diethylthiourea; trade name "Nocceler EUR" produced by Ouchi Shinko Chemical Industrial Co., Ltd.
*12: Zinc dibenzyldithiocarbamate; trade name "Nocceler ZTC" produced by Ouchi Shinko Chemical Industrial Co., Ltd.
*13: Zinc isopropyl xanthate; trade name "Nocceler ZIX-O" produced by Ouchi Shinko Chemical Industrial Co., Ltd.
*14: 2,2,4-Trimethyl-1,2-dihydroquinoline polymer; trade name "Nocrac 224" produced by Ouchi Shinko Chemical Industrial Co., Ltd.
*15: N-tert-butyl-2-benzothiazolylsulfenamide, Sanshin Chemical's trade name "Sanceler NS"
*16: JSR's emulsion-polymerized styrene-butadiene copolymer rubber (SBR), trade name "#1712"
*17: Asahi Kasei's solution-polymerized styrene-butadiene copolymer rubber (SBR), trade name "Tufdene 3835"
*18: 3-Octanoylthiopropyltriethoxysilane; trade name "NXT silane" (registered trademark) produced by Momentive Performance Materials Inc.
*19: A silane coupling agent represented by the above chemical formula (VII); trade name "NXT-Z" (registered trademark) produced by Momentive Performance Materials Inc.
*20: silane coupling agent obtained in Production Example 1 and represented by the following average compositional formula:

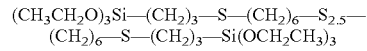

$(CH_3CH_2O)_3Si—(CH_2)_3—S—(CH_2)_6—S_{2.5}—(CH_2)_6—S—(CH_2)_3—Si(OCH_2CH_3)_3$

*21: Asahi Kasei's solution-polymerized styrene-butadiene copolymer rubber (SBR), trade name "Tufdene 2000"

INDUSTRIAL APPLICABILITY

According to the production method for a rubber composition of the present invention, it is possible to obtain a rubber composition excellent in low-heat-generation property with successfully inhibiting the coupling function activity of the silane coupling agent used from lowering and with further increasing the coupling activity thereof, and is therefore favorably used as a production method for constitutive members of various types of pneumatic tires for passenger cars, small-size trucks, minivans, pickup trucks and big-size vehicles (trucks, buses, construction vehicles, etc.) and others, especially for tread members of pneumatic radial tires.

The invention claimed is:

1. A process for producing a rubber composition comprising a rubber component (A) comprising at least one selected from the group consisting of natural rubbers and synthetic diene rubbers, a filler containing an inorganic filler (B), a silane coupling agent (C), and at least two kinds of chemical agents (D) and (E) selected from the group consisting of guanidines, sulfenamides, thiazoles, thiurams, dithiocarbamates, thioureas, and xanthates, wherein the rubber composition is kneaded in a kneading step comprising three or more stages wherein, in the first stage (X) of kneading, the rubber component (A), all or a portion of the inorganic filler (B), all or a portion of the silane coupling agent (C) are kneaded;

in a stage (Y) after the first stage but before the last stage of kneading, at least two kinds of the chemical agents (D) and (E) selected from the group consisting of guanidines, sulfenamides, thiazoles, thiurams, dithiocarbamates, thioureas, and xanthates are added and kneaded;

and, in the last stage (Z) of kneading, a vulcanizing agent and a guanidine or thiazole are added and kneaded;

wherein the maximum temperature of the rubber composition in the first stage (X) of kneading is 120 to 190° C., and the maximum temperature of the rubber composition in the stage (Y) of kneading is 130 to 175° C.

2. The process for producing a rubber composition according to claim 1, wherein the silane coupling agent (C) is at least one compound selected from the group consisting of the compounds represented by the following general formulae (I) to (IV):

[Chemical Formula 1]

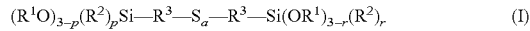
$(R^1O)_{3-p}(R^2)_p Si—R^3—S_a—R^3—Si(OR^1)_{3-r}(R^2)_r$ (I)

in the formula, $R^1$'s may be the same or different and are each a linear, cyclic, or branched alkyl group, having 1 to 8 carbon atoms, or a linear or branched alkoxyalkyl group having 2 to 8 carbon atoms; $R^2$'s may be the same or different and are each a linear, cyclic, or branched alkyl group, having 1 to 8 carbon atoms; $R^3$'s may be the same or different and are each a linear or branched alkylene group, having 1 to 8 carbon atoms; a is 2 to 6 as an average value; and p and r may be the same or different and are each 0 to 3 as an average value, provided that p and r are not 3 at the same time;

[Chemical Formula 2]

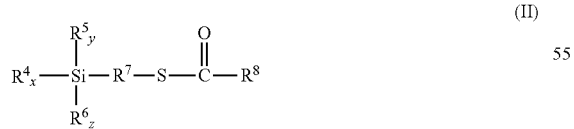

(II)

in the formula, $R^4$ is a monovalent group selected from the group consisting of —Cl, —Br, $R^9O$—, $R^9(C=O)O$—, $R^9R^{10}C=NO$—, $R^9R^{10}CNO$—, $R^9R^{10}N$—, and —$(OSiR^9R^{10})_h(OSiR^9R^{10}R^{11})$, wherein $R^9$, $R^{10}$, and $R^{11}$ may be the same or different and are each a hydrogen atom or a monovalent hydrocarbon group having 1 to 18 carbon atoms, and h is 1 to 4 as an average value; $R^5$ represents $R^4$, a hydrogen atom, or a monovalent hydrocarbon group having 1 to 18 carbon atoms; $R^6$ represents $R^4$, $R^5$, a hydrogen atom, or a —$[O(R^{12}O)_j]_{0.5}$— group, wherein $R^{12}$ is an alkylene group having 1 to 18 carbon atoms and j is an integer from 1 to 4; $R^7$ represents a divalent hydrocarbon group having 1 to 18 carbon atoms; $R^8$ represents a monovalent hydrocarbon group having 1 to 18 carbon atoms; and x, y, and z are numbers which satisfy the relationships: x+y+2z=3, 0≤x≤3, 0≤y≤2, and 0≤z≤1;

[Chemical Formula 3]

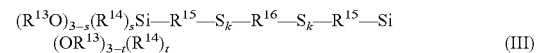

$(R^{13}O)_{3-s}(R^{14})_s Si—R^{15}—S_k—R^{16}—S_k—R^{15}—Si(OR^{13})_{3-t}(R^{14})_t$ (III)

in the formula, $R^{13}$'s may be the same or different and are each a linear, cyclic, or branched alkyl group, having 1 to 8 carbon atoms, or a linear or branched alkoxyalkyl group having 2 to 8 carbon atoms; $R^{14}$'s may be the same or different and are each a linear, cyclic, or branched alkyl group, having 1 to 8 carbon atoms; $R^{15}$'s may be the same or different and are each a linear or branched alkylene group, having 1 to 8 carbon atoms; $R^{16}$ is a divalent group of any of general formulae —S—$R^{17}$—S—, —$R^{18}$—$S_{m1}$—$R^{19}$—, and —$R^{20}$—$S_{m2}$—$R^{21}$—$S_{m3}$—$R^{22}$—, wherein $R^{17}$ to $R^{22}$ may be the same or different and are each a divalent hydrocarbon group, a divalent aromatic group, or a divalent organic group containing a heteroatom other than sulfur or oxygen, each having 1 to 20 carbon atoms; and m1, m2, and m3 may be the same or different and are each 1 or more but less than 4 as an average value; k's may be the same or different and are each 1 to 6 as an average value; s and t may be the same or different and are each 0 to 3 as an average value, provided that s and t are not 3 at the same time;

[Chemical Formula 4]

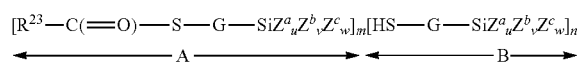

(IV)

$[R^{23}—C(=O)—S—G—SiZ^a_u Z^b_v Z^c_w]_m [HS—G—SiZ^a_u Z^b_v Z^c_w]_n$
←————A————→ ←——B——→ in the formula, $R^{23}$ is a linear, branched, or cyclic alkyl group, having 1 to 20 carbon atoms; G's may be the same or different and are each an alkanediyl group or an alkenediyl group, having 1 to 9 carbon atoms; $Z^a$'s may be the same or different and are each a group which can bond to two silicon atoms and is selected from [—O—]$_{0.5}$, [—O-G-]$_{0.5}$, or [—O-G-O—]$_{0.5}$; $Z^b$'s may be the same or different and are each a group which can bond to two silicon atoms and is a functional group represented by [—O-G-O—]$_{0.5}$; $Z^c$'s may be the same or different and are each a functional group represented by —Cl, —Br, —$OR^a$, $R^a C(=O)O$—, $R^a R^b C=NO$—, $R^a R^b N$—, $R^a$—, HO-G-O—, wherein G is the same as above; $R^a$ and $R^b$ may be the same or different and are each a linear, branched, or cyclic alkyl group, having 1 to 20 carbon atoms; and m, n, u, v, and w may be the same or different and 1≤m≤20, 0≤n≤20, 0≤u≤3, 0≤v≤2, 0≤w≤1, and (u/2)+v+2w=2 or 3; wherein an A portion is represented by [$R^{23}$—C(=O)—S-G-Si$Z^a_u Z^b_v Z^c_w$]$_m$ and a B portion is represented by [HS-G-Si$Z^a_u Z^b_v Z^c_w$]$_n$; when the A portion exists in plurality, $Z^a_u$'s, $Z^b_v$'s, and $Z^c_w$'s in the plural A portions may each be the same or different; and, when the B portion exists in plurality, $Z^a_u$'s, $Z^b_v$'s, and $Z^c_w$'s in the plural B portions may each be the same or different.

3. The method for producing a rubber composition according to claim 2, the silane coupling agent (C) is a compound represented by the general formula (I).

4. The method for producing a rubber composition according to claim 1, wherein the inorganic filler (B) is silica.

5. The process for producing a rubber composition according to claim 1, wherein the filler further contains carbon black.

6. The method for producing a rubber composition according to claim 1, wherein the inorganic filler (B) accounts for at least 40% by mass of the filler.

7. The process for producing a rubber composition according to claim 1, wherein, in stage (Y), one of the chemical agents (D) and (E) is selected from the group consisting of guanidines.

8. The process for producing a rubber composition according to claim 1, wherein, in stage (Y), one of the chemical agents (D) and (E) is selected from the group consisting of thiazoles.

9. The process for producing a rubber composition according to claim 1, wherein, in stage (Y), one of the chemical agents (D) and (E) is selected from the group consisting of sulfenamides.

10. The process for producing a rubber composition according to claim 1, wherein, in stage (Y), one of the chemical agents (D) and (E) is selected from the group consisting of thiurams.

11. The process for producing a rubber composition according to claim 1, wherein, in stage (Y), one of the chemical agents (D) and (E) is selected from the group consisting of dithiocarbamates.

12. The process for producing a rubber composition according to claim 1, wherein, in stage (Y), one of the chemical agents (D) and (E) is selected from the group consisting of thioureas.

13. The process for producing a rubber composition according to claim 1, wherein, in stage (Y), one of the chemical agents (D) and (E) is selected from the group consisting of xanthates.

14. The method for producing a rubber composition according to claim 1, wherein the guanidine in stages (Y) and (Z) is at least one compound selected from the group consisting of 1,3-diphenylguanidine, 1,3-di-o-tolylguanidine and 1-o-tolylbiguanide.

15. The process for producing a rubber composition according to claim 1, wherein, in stage (Y), the sulfonamides are N-cyclohexyl-2-benzothiazolylsulfenamide, N-tert-butyl-2-benzothiazolylsulfenamide and combinations thereof.

16. The process for producing a rubber composition according to claim 1, wherein the thiazoles in stages (Y) and (Z) is 2-mercaptobenzothiazole, di-2-benzothiazolyl disulfide and combinations thereof.

17. The process for producing a rubber composition according to claim 1, wherein, in stage (Y), the thiurams are tetrakis(2-ethylhexyl)thiuram disulfide, tetrabenzylthiuram disulfide and combinations thereof.

18. The process for producing a rubber composition according to claim 1, wherein, in stage (Y), the thioureas are at least one compound selected from the group consisting of N,N'-diethylthiourea, trimethylthiourea, N,N'-diphenylthiourea, and N,N'-dimethylthiourea.

19. The process for producing a rubber composition according to claim 1, wherein, in stage (Y), the dithiocarbamates are at least one compound selected from the group consisting of zinc dibenzyldithiocarmamate, zinc N-ethyl-N-phenyl dithiocarbamate, zinc dimethyldithiocarbamate, and copper dimethyldithiocarbamate.

20. The process for producing a rubber composition according to claim 1, wherein, in stage (Y), the xanthate is a zinc isopropyl xanthate.

21. The process for producing a rubber composition according to claim 1, wherein an organic acid compound (G) is added in a stage of kneading after addition of the silane coupling agent (C).

22. The process for producing a rubber composition according to claim 21, wherein the organic acid compound (G) is stearic acid.

* * * * *